United States Patent
Speicher

(10) Patent No.: US 6,836,762 B2
(45) Date of Patent: *Dec. 28, 2004

(54) INTERNET-AUDIOTEXT ELECTRONIC ADVERTISING SYSTEM WITH ANONYMOUS BI-DIRECTIONAL MESSAGING

(76) Inventor: Gregory J. Speicher, 651F Lakeview Plaza Blvd., Worthington, OH (US) 43085

( * ) Notice: Subject to any disclaimer, the term of this patent is extended or adjusted under 35 U.S.C. 154(b) by 415 days.

This patent is subject to a terminal disclaimer.

(21) Appl. No.: 09/903,375

(22) Filed: Jul. 11, 2001

(65) Prior Publication Data

US 2002/0055873 A1 May 9, 2002

Related U.S. Application Data

(63) Continuation of application No. 08/799,536, filed on Feb. 12, 1997, now Pat. No. 6,285,984, which is a continuation-in-part of application No. 08/744,879, filed on Nov. 8, 1996, now abandoned.

(51) Int. Cl.[7] .............................................. G06F 17/60
(52) U.S. Cl. ............................. 705/14; 705/1; 705/27; 705/37
(58) Field of Search ............................. 705/14, 10, 16, 705/26, 27, 28, 37, 1

(56) References Cited

U.S. PATENT DOCUMENTS

| | | | | |
|---|---|---|---|---|
| 4,979,216 A | * | 12/1990 | Malsheen et al. ............. | 381/52 |
| 5,283,731 A | * | 2/1994 | Lalonde et al. ............. | 364/401 |
| 5,675,507 A | * | 10/1997 | Bobo, II ..................... | 364/514 |
| 5,737,395 A | * | 4/1998 | Irribarren .................... | 379/88 |
| 5,768,348 A | * | 6/1998 | Solomon et al. ............. | 379/67 |
| 5,796,395 A | * | 8/1998 | de Hond ..................... | 345/331 |
| 5,799,284 A | * | 8/1998 | Bourquin .................... | 705/26 |
| 5,818,836 A | * | 10/1998 | DuVal ........................ | 370/389 |
| 5,850,433 A | * | 12/1998 | Rondeau ..................... | 379/201 |
| 5,909,670 A | * | 6/1999 | Trader et al. ................ | 705/14 |
| 5,937,390 A | * | 8/1999 | Hyodo ........................ | 705/14 |
| 5,996,006 A | * | 11/1999 | Speicher ..................... | 709/218 |
| 6,064,967 A | * | 5/2000 | Speicher ..................... | 705/14 |
| 6,073,105 A | * | 6/2000 | Sutcliffe et al. ............. | 705/1 |
| 6,243,375 B1 | * | 6/2001 | Speicher ..................... | 370/352 |
| 6,282,515 B1 | * | 8/2001 | Speicher ..................... | 705/14 |
| 6,285,984 B1 | * | 9/2001 | Speicher ..................... | 705/14 |
| 6,502,077 B1 | * | 12/2002 | Speicher ..................... | 705/14 |

FOREIGN PATENT DOCUMENTS

| | | |
|---|---|---|
| EP | 0 794 650 A2 * | 9/1997 |
| WO | WO 9605564 A1 * | 2/1996 |

OTHER PUBLICATIONS

Bowen, Charles, "Online Connections", HomePC, vol. 2, Issue 2, Feb. 1995.*

Reina, Laura, "Classified Voice Mail", Editor & Publisher, vol. 129, Issue 16, p. 20, Apr. 20, 1996.*

(List continued on next page.)

*Primary Examiner*—John W. Hayes
(74) *Attorney, Agent, or Firm*—Ward & Olivo

(57) ABSTRACT

The present invention relates to an electronic advertising system. More specifically, the present invention allows telephone users to create a "mailbox" at the point of responding to an ad, regardless of whether the ad originated on the telephone or on the Internet. Similarly, Internet users can create a "mailbox" at the point of responding to a personal ad on the Internet, regardless of whether the ad originated on the telephone or via the Internet. By giving both advertisers and respondents a "mailbox", the present invention allows for anonymous communication until one or both are comfortable with giving out a means of contact. Moreover, the communication can occur regardless of whether a user is on a telephone or on the Internet. This provides additional safety for users of personal ad systems while preserving the ability for telephone users to communicate with Internet users.

20 Claims, 17 Drawing Sheets

OTHER PUBLICATIONS

Bubbeo et al, "Meeting Your Match Online", NetGuide, vol. 4, Issue 2, p. 92, Feb. 1997.*

Hibbard, Cynthia, "'Personals' Firms Still Lure Customers, Owners", Arizona Business Gazette, vol. 112, No. 24, p. 3, Jun. 1992.*

Bianchi, Alessandra, "The Personals Touch", Inc., vol. 16, No. 14, p. 81, Dec. 1994.*

Hoye, David, "Romance in the Air? Check Out Love on Net", The Pheonix Gazette, Feb. 13, 1995.*

Anonymous, "Through the Ages, Successful Search for 'Perfect Match' Evolves into Voice Personals", Press Release, Dialog File 813:PR Newswire, Jan. 25, 1996.*

Wanchek, Natasha, "www.love.match With Online Romance Blooming, Traditional dating Services May Lose Their Appeal", San Jose Mercury News, Morning Final Section: Business, Feb. 10, 1997.*

Ozer, Jan, "Online Audio On Demand", Computer Shopper, vol. 16, No. 1, p. 676, Jan. 1996.

Anonymous, "Singles On–Line Will Link Singles With Technology", Business Wire, Dialog File 621:Gale Group New Product Announcement, Sep. 17, 1996.*

Anonymous, "Singles On–Line Announces Website Launch", Business Wire, Dialog File 621:Gale Group New Product Announcement, Dec. 3, 1996.*

Anonymous, "New Web Site For Singles Arrives Just in Time for Valentine's Day", Business Wire, Dialog File 621:Gale Group New Product Announcement, Feb. 3, 1997.*

Bryan, Susannah, "Surfing The Net For A Soul Mate", Palm Beach Post, Feb. 8, 1997.*

* cited by examiner

FIG. 2

AD PERSONAL TABLE

| FIELD NAME | REF. # | DESCRIPTION |
|---|---|---|
| AD_MAILBOX_NUMBER | 201 | THE FIVE DIGIT MAILBOX NUMBER ASSIGNED TO AN ADVERTISER. THE MAILBOX NUMBER IS USED AS AN ELECTRONIC MAIL ADDRESS FOR MULTIMEDIA RESPONSES. |
| AD_PASSWORD | 202 | AN ADVERTISER'S 5 DIGIT PASSWORD |
| AD_PHONE | 203 | AN ADVERTISER'S PHONE NUMBER |
| AD_EMAIL_ADDRESS | 204 | THE ELECTRONIC MAILBOX ADDRESS OF AN ADVERTISER. |
| AD_EMAIL_FILENAME | 205 | THE FILENAME OF AN E-MAIL AUDIO FILE RECEIVED FROM AN ADVERTISER |
| AD_DATE | 206 | THE DATE AN AD IS PLACED |
| AD_GENDER | 207 | THE GENDER OF AN ADVERTISER |
| AD_MARITAL_STATUS | 208 | THE MARITAL STATUS OF AN ADVERTISER |
| AD_AGE | 209 | THE AGE OF AN ADVERTISER |
| AD_REVIEW_FLAG | 210 | SET TO FALSE TO INDICATE THAT AN AD NEEDS TO BE REVIEWED. |
| AD_ORIGIN | 211 | INDICATES IF AD ORIGINATES ON THE IVR OR THE IWS |
| AD_MARITAL_SOUGHT | 212 | THE MARITAL STATUS OF THE PERSON SOUGHT BY AN ADVERTISER |
| AD_LOW_AGE_SOUGHT | 213 | THE LOWEST AGE OF THE PERSON SOUGHT BY AN ADVERTISER |
| AD_HIGH_AGE_SOUGHT | 214 | THE HIGHEST AGE OF THE PERSON SOUGHT BY AN ADVERTISER |

FIG. 3

AD GREETINGS TABLE

| FIELD NAME | REF. # | DESCRIPTION |
|---|---|---|
| GR_MAILBOX_NUMBER | 301 | THE FIVE DIGIT MAILBOX NUMBER ASSIGNED TO AN AD. |
| GR_TYPE | 302 | THE TYPE OF GREETING STORED (TEXT, VOX, WAV, REALAUDIO, PHOTO, ETC..). |
| GR_REVIEW_FLAG | 303 | THE FLAG DENOTES IF A FILE HAS BEEN REVIEWED. |
| GR_FILENAME | 304 | THE FILENAME OF A GREETING. |
| GR_DATE_TIME | 305 | DATE AND TIME A GREETING IS POSTED TO THE DATABASE. |
| GR_CONVERSION_FLAG | 306 | SET TO FALSE IF A FILE REQUIRES CONVERSION TO ANOTHER FORMAT. |

FIG. 4

AD PERSONAL RESPONDENTS TABLE

| FIELD NAME | REF. # | DESCRIPTION |
|---|---|---|
| PR_MAILBOX_NUMBER | 401 | THE FIVE DIGIT MAILBOX NUMBER ASSIGNED TO A RESPONDENT. THE MAILBOX NUMBER IS USED AS AN ELECTRONIC MAIL ADDRESS FOR MULTIMEDIA RESPONSES. |
| PR_PASSWORD | 402 | A RESPONDENT'S FIVE DIGIT PASSWORD. |
| PR_DATE | 403 | DATE A RESPONDENT CREATES A MAILBOX. |

FIG. 5

AD RESPONSE TABLE

| FIELD NAME | REF. # | DESCRIPTION |
|---|---|---|
| RSP_MAILBOX_NUMBER | 501 | THE FIVE DIGIT MAILBOX NUMBER OF THE PERSON RESPONDED TO. |
| RSP_RMAILBOX_NUMBER | 502 | A RESPONDENTS MAILBOX NUMBER. |
| RSP_DATE_TIME | 503 | THE DATE AND TIME A RESPONSE IS MADE. |
| RSP_TYPE | 504 | THE TYPE OF RESPONSE FILE (TEXT, VOX, WAV, REALAUDIO, ETC..). |
| RSP_FILENAME | 505 | THE FILENAME OF A RESPONSE. |
| RSP_CONVERSION_FLAG | 506 | SET TO FALSE IF THE FILE REQUIRES CONVERSION TO ANOTHER FORMAT. |

FIG. 12

OUTGOING AND FUN    87654

I AM A SINGLE WHITE FEMALE, AGE 25, WHO ENJOYS MOVIES, DINING OUT, TRAVEL AND THE OUTDOORS. I WORK AS A SECRETARY AT A LAW OFFICE AND LOVE MY JOB. I'M LOOKING FOR AN ATTRACTIVE SINGLE WHITE MALE, AGE 25 TO 30, FOR FRIENDSHIP AND POSSIBLE ROMANCE.

NICE GUYS FINISH FIRST    45378

I AM A DIVORCED BLACK MALE, AGE 40, AND AM NEW TO THE AREA. I WAS RECENTLY TRANSFERRED HERE BY MY COMPANY AND AM LOOKING FOR A NEW FRIEND. I'M SEEKING A NICE BLACK FEMALE WHO CAN SHOW ME AROUND.

URBAN COWBOY    67672

I AM A SINGLE WHITE MALE WHO LOVES COUNTRY MUSIC AND THE OUTDOORS. I HAVE A SMALL HORSE FARM OUTSIDE OF TOWN I WOULD LOVE TO SHOW THAT SPECIAL SOMEONE. I ALSO ENJOY COOKING, HIKING, SWIMMING, AND TENNIS. I'M LOOKING FOR SOMEONE WITH SIMILAR INTERESTS.

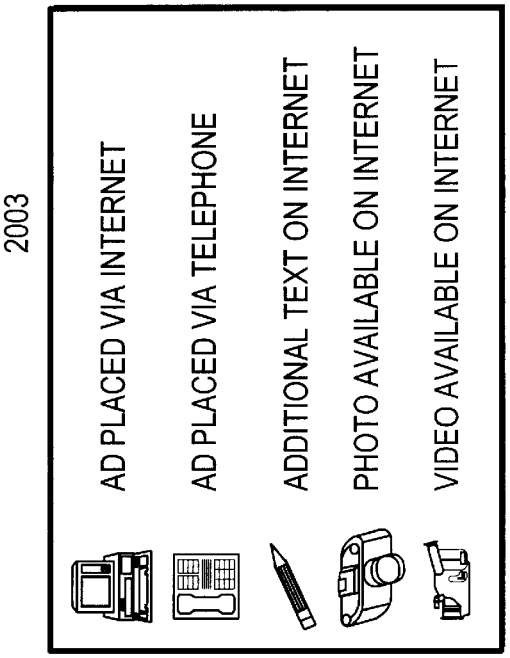

- AD PLACED VIA INTERNET
- AD PLACED VIA TELEPHONE
- ADDITIONAL TEXT ON INTERNET
- PHOTO AVAILABLE ON INTERNET
- VIDEO AVAILABLE ON INTERNET

INTERNET-AUDIOTEXT ELECTRONIC ADVERTISING SYSTEM WITH ANONYMOUS BI-DIRECTIONAL MESSAGING

CROSS-REFERENCE TO RELATED APPLICATIONS

This application is a continuation of application Ser. No. 08/799,536, filed on Feb. 12, 1997, now U.S. Pat. No. 6,285,984, issued on Sep. 4, 2001, which is a continuation-in-part of application Ser. No. 08/744,879, filed on Nov. 8, 1996, now abandoned.

TECHNICAL FIELD OF THE INVENTION

The present invention relates to audiotext systems designed to provide full access to traditional databases and telecommunications systems, such as local area networks, the Internet, other external databases, telephones and fax machines, etc., and more specifically to audiotext personal ad services.

BACKGROUND OF THE INVENTION

Audiotext personal ad services are a popular way for people to meet, and are available in most newspapers and on many cable television systems. In a typical service, an advertiser calls a live operator and places a text personal ad. An advertiser then calls an audiotext system and records an audio message, often referred to as a greeting, which expands upon the advertiser's text ad by describing in more detail the advertiser and the type of person he is seeking. Personal ads are then published in a newspaper. A personal ad includes a 900 telephone number and an ad mailbox number permitting a caller to listen to an advertiser's voice greeting. A caller can respond to an ad by recording a reply voice mail message for the advertiser. An advertiser retrieves a message by calling the audiotext system and entering a password given at the time of ad placement. In another format, live operators are not used. Instead, an advertiser first records an audio greeting via a telephone. An operator then listens to the audio greeting off-line and writes a text summary of the audio greeting for publication in the newspaper.

With the expansion of the Internet and other on-line services, personal ad services have been created to take advantage of this new medium. A typical service allows an advertiser to place a text personal ad that is published on the Internet on an HTML (HyperText Markup Language) page. An Internet user may respond to a personal ad by sending an advertiser a message via electronic mail. The limitation of this approach is that an Internet user cannot listen to an audio recording of an advertiser, a feature that is the central to audiotext personal ad services. Another limitation is that many people do not have Internet access, thus limiting the number of advertisers and respondents.

In another format, an attempt is made to integrate audiotext personal ad services with the Internet. Using this approach, personal ads are published in both the newspaper and on the Internet. Each personal ad includes a 900 telephone number and an ad mailbox number permitting a caller to listen to an advertiser's voice greeting. This approach still has the disadvantage of not allowing an Internet user to listen to an advertiser's voice greeting via the Internet. Moreover, an Internet user can only respond to a personal ad via a telephone because this approach does not allow Internet users to exchange messages with telephone users.

To summarize, existing Internet personal ad services are limited in that they lack many of the features available on audiotext personal ad services. Also, existing personal ad services do not provide a means for those using an audiotext personal ad service to effectively communicate with those using an Internet personal ad service and vice versa. Therefore, there is a need for a personal ad system that seamlessly integrates an audiotext system with an Internet server, allowing straightforward communication between those using a telephone and those using the Internet. Such a system has been disclosed in detail by the applicant in pending application Ser. No. 08/744,879. However, there still remains the need to address some of the problems inherent in an integrated audiotext and Internet based personal ad service.

A basic problem is that when a person responds to a personal ad via a telephone, she must give the advertiser a way to be contacted. Similarly, when a person responds to a personal ad via the Internet, she must also give a way to be contacted. This typically consists of leaving a telephone number, street address, or electronic mail address. Many people are reluctant to give out this information to the advertiser. They prefer to be able to communicate anonymously with an advertiser until they are comfortable with giving out contact information. Therefore, the need arises for a system that allows respondents to instantaneously create a private mailbox at the point of responding to an ad. This feature must also support seamless communication between telephone users and Internet users.

SUMMARY OF THE INVENTION

The present invention allows telephone users to create a mailbox at the point of responding to an ad, regardless of whether the ad originated on the telephone or on the Internet. Similarly, Internet users can create a mailbox at the point of responding to a personal ad on the Internet, regardless of whether the ad originated on the telephone or via the Internet. By giving both advertisers and respondents a mailbox, they can communicate anonymously with each other until one or both are comfortable with giving out a means of contact. Moreover, said communication can occur regardless of whether a user is on a telephone or on the Internet. This useful feature provides additional safety to users of personal ad systems while preserving the ability for telephone users to seamlessly communicate with Internet users. The significant advantages provided by the present invention are apparent from the above description.

BRIEF DESCRIPTION OF DRAWINGS

For a more complete understanding of the present invention, reference is made to the following drawings, in which:

FIG. 2 shows a table of the fields used for storing personal data, including a brief description of the particular fields.

FIG. 3 shows a table of the fields used for storing greetings data, including a brief description of the particular fields.

FIG. 4 shows a table of the fields used for storing response data, including a brief description of the particular fields.

FIG. 5 shows a table of the fields used for storing response data, including a brief description of the particular fields.

FIG. 12 shows personal ads as they would appear in a local newspaper.

DETAILED DESCRIPTION OF THE PREFERRED EMBODIMENT

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
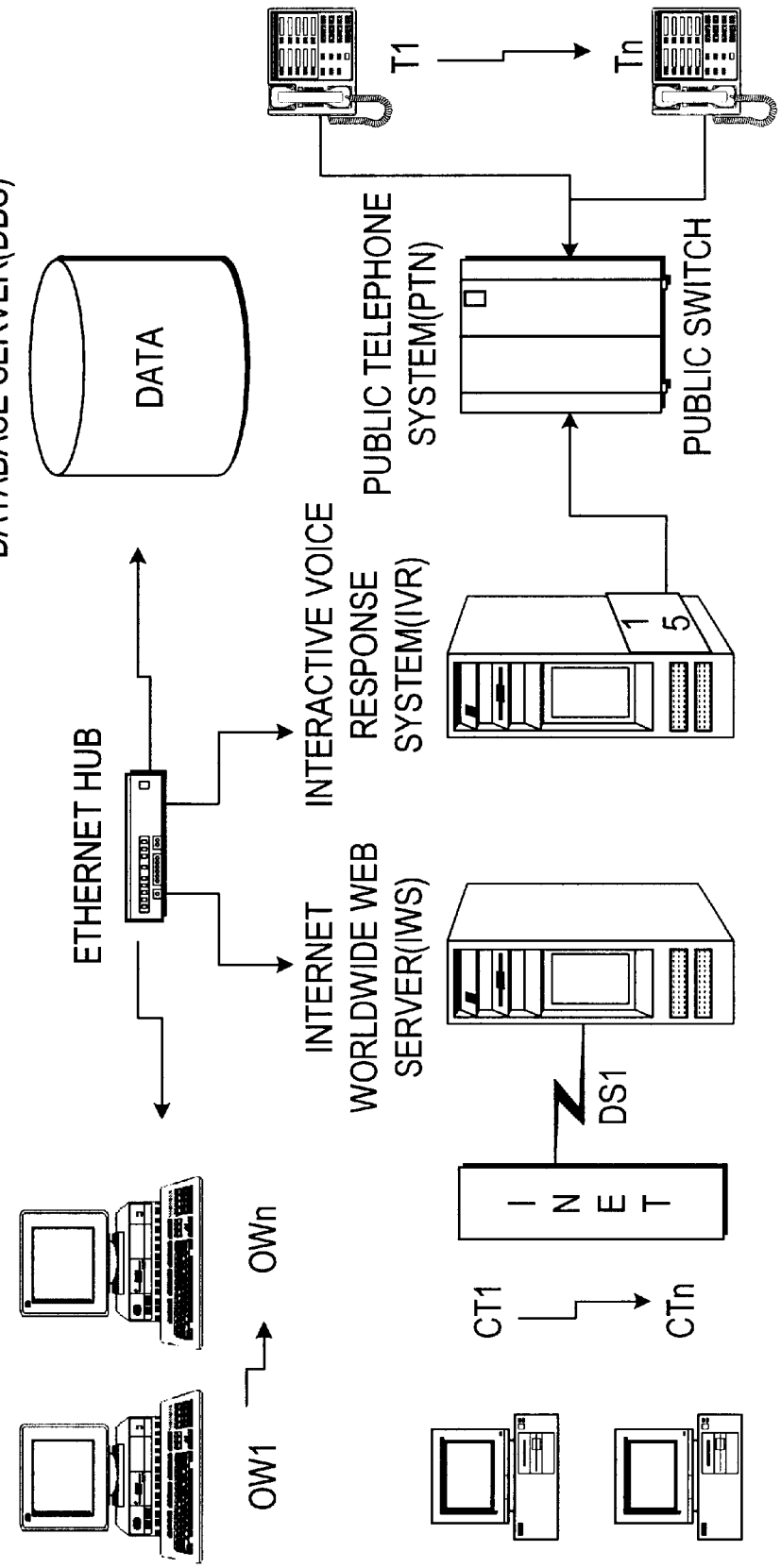
FIG. 1 shows a schematic representation of the present invention.

Referring initially to FIG. 1, a series of remote telephone terminals T1–Tn are represented. In addition, a series of remote computer terminals CT1–CTn are represented. The indicated terminals T1–Tn represent the multitude of telephone terminals existing in association with the public telephone network (PTN). The indicated computer terminals CT1–CTn represent the multitude of computer terminals connected to the Internet.

The PTN, which accommodates the individual terminals T1–Tn, is coupled to an Interactive Voice Response System (IVR). The Internet, which accommodates individual computer terminals CT1–CTn, is coupled to an Internet Web Server (IWS). Individual callers use the individual telephone stations T1 through Tn to interface the IVR through the PTN. Individual users at computer terminals CT1 through CTn use the Internet to interface the IWS. Telephone callers and Internet users may record digital audio messages that can be listened to from any of the remote telephone terminals T1–Tn or from any of the remote computer terminals CT1–CTn. Internet users may also leave digital text messages that may be accessed from any of the remote telephone terminals T1–Tn using text to speech or from the remote computer terminals CT1–CTn via computer monitor.

Considering the system of FIG. 1 in somewhat greater detail, it is to be understood that the PTN has multiplexing capability for individually coupling the terminals T1–Tn to the IVR on request. In the illustrative embodiment of the system, the individual terminals T1–Tn take the form of existing traditional or conventional telephone instruments. It is also to be understood that the Internet has the capability for individually connecting the computer terminals CT1–CTn to the IWS. In the illustrative embodiment of the system, the individual computer terminals CT1–CTn take the form of personal computers that comprise a central processing unit CPU, modem, monitor, keyboard, hard drive, sound card, speakers, and microphone.

Considering the IVR in somewhat greater detail, the PTN is coupled to an IVR as shown in FIG. 1. In the disclosed embodiment, from the PTN, forty-eight lines are connected to the IVR and, accordingly, the IVR may accommodate up to forty-eight simultaneous calls from the public telephone network PTN. The IVR contains a processor, an exemplary form of which is an Intel 166 MHz Pentium Processor. The forty-eight lines from the PTN are connected to the processor though an interface 15, an exemplary form of which is a series of commercially available Dialogic (D240SC-T1) cards. The interface incorporates modems, tone decoders, switching mechanisms, Dialed Number Identification Service (DNIS) and Automatic Number Identification (ANI) capability. The Dialogic card stores audio information in the Dialogic .VOX format.

Generally, DNIS capability is a function of the PTN to provide digital data indicating the called number. ANI capability is a similar function whereby the digital data indicates the calling number.

Considering the IWS in somewhat greater detail, the IWS is coupled to the Internet via a DSI line to a local Internet provider service. The IWS may accommodate a multitude of simultaneous Internet users. As represented, the IWS is a micro computer programmed for Internet information server operations. The IWS contains a processor and Internet server software, exemplary forms of which are an Intel 166 Mhz Pentium Processor and Microsoft Internet Information Server software.

The IWS is also loaded with RealAudio Server software from Progressive Network. RealAudio allows a Microsoft Windows .WAV file to be converted into a RealAudio .RA file, a compressed format that allows play back over the Internet in real time, as opposed to first downloading a file and then listening to it. RealAudio accomplishes this by playing an audio file while it is still downloading, using a process called data streaming.

The IWS is also loaded with VDOLive Server software. VDOLive allows a video clip in the Microsoft Windows AVI, Apple Quicktime, or MPEG video file formats to be converted into a VDOLive .VDO format, a compressed format that allows play back over the Internet in real time, as opposed to first downloading a file and then listening to it. VDOLive also utilizes data streaming.

The IVR and the IWS are coupled to a Database Server (DBS) via an Ethernet hub as shown in FIG. 1. The system includes one or more Operator Workstations OW1–OWn, through which an operator can interact with and control the DBS, IVR and IWS.

The DBS is a computer programmed for database operations. In the illustrated embodiment, the DBS manages a personal Ad Database which is comprised of multiple tables that manage ad creation, the audio greeting files, ad response files, photograph and video files. The Ad Database comprises an electronic equivalent of the personal classified ads placed via telephone and the Internet, and responses placed to ads.

The IVR converts audio files received via telephone into the RealAudio .RA format for real time retrieval via the Internet. Conversely, the IWS converts audio files received via the Internet into Dialogic .VOX files for retrieval via telephone. Audio file conversions are done through audio file conversion software, an exemplary form of which is Sound Forge by Sonic Foundry.

The DBS contains a processor and an SQL (Structured Query Language) relational database software, exemplary forms of which are the Intel 166 Mhz Pentium Processor and Microsoft SQL Server.

The Operator Workstation (OW) is a conventional personal computer equipped with a sound card capable of playing the audio data and a video display capable of displaying digitally stored photographs and videos. An exemplary form of the OW is a microcomputer equipped with an Intel 166 Mhz Pentium Processor and a Creative Labs Sound Blaster sound card. Operators review all incoming advertiser files—text, audio, photograph, and video—to insure that their content is appropriate. Also, operators create text ads for publication in a newspaper.

The following sections describe in greater detail the interaction between the IVR, the DBS, the IWS, and the OW.

Placing an Ad Through a Telephone

Figure 6:
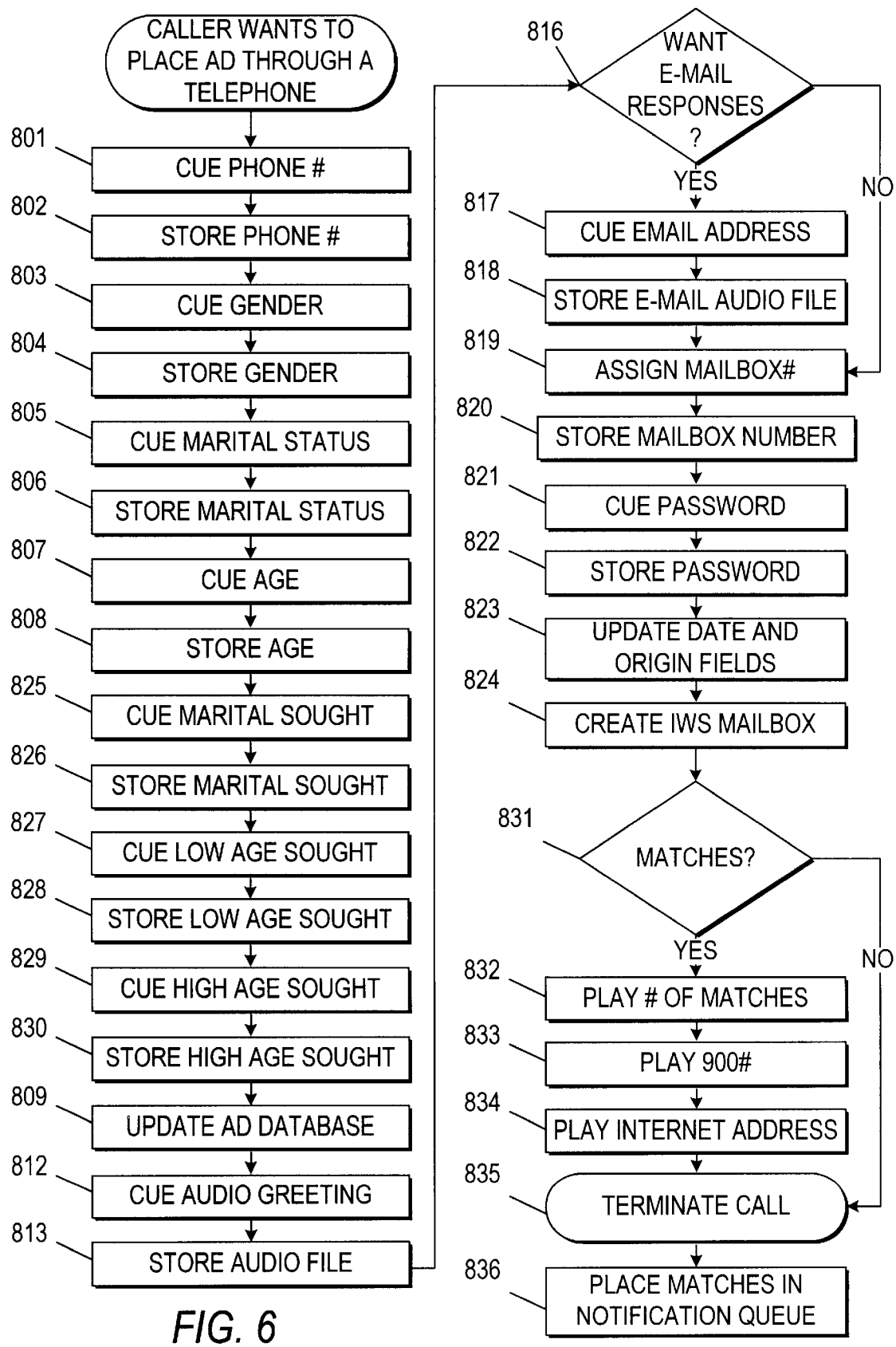
FIG. 6 shows a flow diagram of an exemplary operation of the present invention, more specifically placing an ad through a telephone.

An exemplary operation of the system of the present invention, with regard to a specific telephone caller placing a personal advertisement will now be treated to accomplish the process as indicated in FIG. 6. First, suppose a telephone caller at terminal T1 makes a call to place a personal advertisement in response to an advertisement in XYZ newspaper. The assumed call involves the telephone caller actuating the buttons to input the number 1 800 555 3333, for example. As a result, signals are provided to the public telephone network resulting in a connection from the remote terminal T1 to the IVR. Using standard DNIS techniques, the IVR associates the called number 1 800 555 3333 with a specific format, for example, a voice personals ad taking format.

The caller is first prompted to create a profile of himself by answering a series of questions using the buttons on his touch tone phone. The profile contains data on the advertiser and the type of person the advertiser wishes to meet. Referring initially to FIG. 6 and FIG. 2, upon receiving a call, the IVR cues the caller to enter his telephone number 801. The IVR stores the telephone number 802 in the field AD_PHONE 203. Next, the IVR cues the caller to enter his gender 803. For example: "If you are a woman, press 1. If you are a man, press 2." The IVR stores the caller's gender 804 in the field AD_GENDER 207. Next, the IVR cues the caller for his marital status 805. For example: "If you are single, press 1. If you are divorced, press 2. If you are widowed, press 3." The caller responds and the IVR stores the caller's marital status 806 in the field AD_MARITAL_STATUS 208. Next, the IVR cues the caller for his age 807. For example: "Please enter your age." The caller's age is then stored 808 in the field AD_AGE 209.

Next, the caller is prompted to indicate the type of person he wishes to meet. The IVR first cues the caller for the martial status of the person he is seeking 825. For example: "If you wish to meet someone who is single, press 1. If you wish to meet someone who is divorced, press 2. If you wish to meet someone who is widowed, press 3." The martial status sought is then stored 826 in the field AD_MARITAL_SOUGHT 212. Next, the IVR cues the caller to enter the lowest age of the person he wishes to meet 827. For example: "Please enter the lowest age of the person you wish to meet." The low age sought is them stored 828 in the field LOW_AGE_SOUGHT 213. Finally, the IVR cues the caller to enter the highest age of the person he wishes to meet 829. For example: "Please enter the highest age of the person you wish to meet." The high age sought is then stored 830 in the field HIGH_AGE_SOUGHT 214. It is to be understood that the actual questions asked about the caller and the person he is seeking are merely illustrative. The actual questions could vary greatly in both number and kind.

Next, the IVR cues the caller to record an audio greeting 812. The advertiser's audio greeting is then stored to a disk file on the IVR 813 and the Ad Database is updated 809. Specifically, the AD_REVIEW_FLAG 210 in the AD_PERSONAL_TABLE of FIG. 2 is set to FALSE indicating that the ad must be reviewed by an operator. In addition, a new record is created in the AD_GREETINGS_TABLE of FIG. 3 and the field GR_REVIEW_FLAG 303 set to FALSE to indicate that the audio greeting has not been reviewed. In the new record, the fields GR_MAILBOX_NUMBER 301, GR_TYPE 302, GR_FILENAME 304, GR_DATE_TIME 305 in the AD_GREETINGS_TABLE of FIG. 3 are also populated to indicate the advertiser's mailbox number, the format of the audio file, the location of the audio file on the IVR, and the date and time the greeting was recorded. The field GR_TYPE is set to VOX to indicate that the audio recording is in the Dialogic .VOX file format. Finally, the field GR_CONVERSION_FLAG 306 is set to FALSE to indicate that the audio file must be converted from the Dialogic .VOX format to create a new audio file in the RealAudio .RA format for playback on the Internet.

The IVR then cues the caller to indicate if he wishes to record an e-mail address 816. For example: "Press 1 to input an e-mail address. Press 2 to decline." If the caller elects to leave an e-mail address, the IVR cues the caller to record his e-mail address 817. The audio recording is stored to a disk file on the IVR 818 and the field AD_EMAIL_FILENAME 205 in AD_PERSONAL_TABLE of FIG. 2 is set, indicating that an e-mail audio file exists and its location on the IVR.

Next, the IVR assigns the advertiser a five digit mailbox number 819. For example: "Your 5-digit mailbox number is 12345." The mailbox number is then stored 820 in the field AD_MAILBOX_NUMBER 201. The IVR then cues the caller to enter a five digit password 821, and the password is stored 822 in the field AD_PASSWORD 202.

In addition, the IVR stores the date the ad is taken in the field AD_DATE_TIME 206, and updates the field AD_ORIGIN 211 to indicate that the personal ad originated on the telephone 823. Finally, the IVR creates an electronic mailbox for the advertiser on the IWS 824, using the mailbox number stored in the field AD_MAILBOX_NUMBER 201 as the electronic mailbox address, to allow respondents to submit audio, video and photographic files in response to the advertiser's ad.

Finally, the IVR queries the Ad Database to determine if there are other existing advertiser's whose profile matches that of the new advertiser 831. More specifically, there is a match if the values in the field AD_MARITAL_STATUS 208 and the values in the field AD_MARITAL SOUGHT 212 match for each ad, and if the value in the field AD_AGE 209 for each ad is within the range of values in the fields AD_LOW_AGE_SOUGHT 213 and AD_HIGH_AGE_SOUGHT 214 for the other ad. If the query finds one or more ads that match, the IVR speaks the number of matching ads to the caller 832. For example: "The number of ads that match your preferences is 5." The caller is then given both a 900 number 833 and an Internet address 834 that can be used to retrieve the matches, and the call is terminated 835. If no matches are found, the call is terminated 835.

In addition, the mailbox numbers of matching ads are placed in a notification queue 836, together with delivery information corresponding to the matching ad so that the existing advertisers can be notified that a new personal ad has come onto the system that matches the existing advertisers' profile. The delivery information includes the telephone number and e-mail address, if available, of the existing advertiser to be notified, together with mailbox number of the new ad coming onto the system.

Placing an Ad Through the Internet

Figure 7:
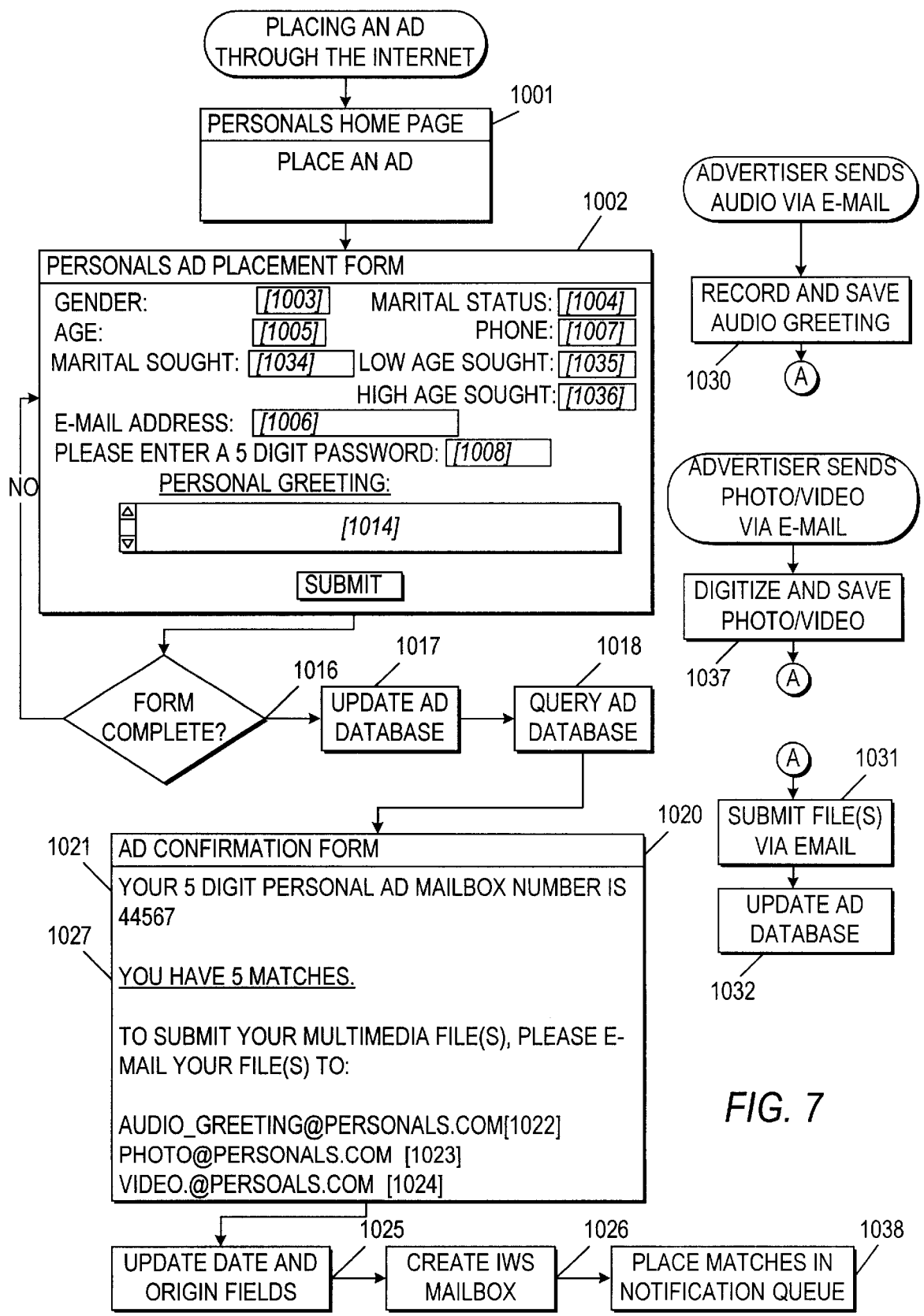
FIG. 7 shows a flow diagram of an exemplary operation of the present invention, more specifically placing an ad through the Internet.

An exemplary operation of the system, with regard to a specific Internet user placing a personal advertisement will now be treated to accomplish the process as indicated in FIG. 7. First, suppose a Internet user at terminal CT1 connects to the Internet to place a personal advertisement in response to an advertisement in XYZ newspaper. The assumed Internet user connects to the Internet and inputs a Uniform Reference Locator (URL), resulting in a connection from the remote terminal CT1 to a Home Page 1001 on the IWS.

Referring to FIG. 7, from the Home Page 1001 on the IWS, the Internet user selects an Ad Placement Form 1002. The Ad Placement Form 1002 contains the following input fields corresponding to fields in the Ad Database as indicated:

| | |
|---|---|
| Gender 1003 | AD_GENDER 207 |
| Marital Status 1004 | AD_MARITAL_STATUS 208 |
| Age 1005 | AD_AGE 209 |
| Martial Sought 1034 | AD_MARTIAL_SOUGHT 212 |
| Low Age Sought 1035 | AD_LOW_AGE_SOUHT 213 |
| High Age Sought 1036 | AD_HIGH_AGE_SOUGHT 214 |
| E-mail address 1006 | AD_EMAIL_ADDRESS 204 |
| Phone Number 1007 | AD_PHONE 203 |
| Password 1008 | AD_PASSWORD 202 |
| Greeting Text 1014 | GR_FILENAME 304 |

This process largely parallels the process of placing a personal ad via a telephone. The password 1008 is used by the advertiser to retrieve messages and the e-mail address 1006 and telephone number 1007 are used to contact the advertiser. The gender 1003, age 1005, and marital status 1004 fields create a profile of the advertiser. The marital sought 1034, low age sought 1035 and high age sought 1036 fields complete the advertiser's profile by indicating the type of person the advertiser wishes to meet. Finally, the field Greeting Text 1014 comprises the advertiser's text personal ad.

The Internet user completes the Ad Placement Form 1002 and presses the "Submit" button to submit her ad. The form is checked by the IWS for completeness 1016. If the form is incomplete, the user is returned to the Ad Placement Form 1002. If the form is complete, the IWS updates the Ad Database 1017. This includes assigning the user a five digit mailbox number and storing it in the field AD_MAILBOX_NUMBER 201. In addition, the advertiser's profile, contact information, password and greeting are added to the Ad Database. Also, the advertiser's text greeting is stored to a disk file on the IWS. Next, the AD_REVIEW_FLAG 210 in the AD_PERSONAL_TABLE of FIG. 2 is set to FALSE indicating that the ad must be reviewed by an operator, a new record is created in the AD_GREETINGS_TABLE of FIG. 3, and the field GR_REVIEW_FLAG 303 is set to FALSE to indicate that the text greeting has not been reviewed. In the new record, the fields GR_MAILBOX_NUMBER 301, GR_TYPE 302, GR_FILENAME 304, GR_DATE_TIME 305 in the AD_GREETINGS_TABLE of FIG. 3 are also populated to indicate the advertiser's mailbox number, the file format, the location of the text file on the IWS, and the date and time the greeting was placed. Specifically, the field GR_TYPE is set to TEXT. Finally, the field GR_CONVERSION_FLAG is set to TRUE to indicate that the text does not need to be converted to a different format.

Next, the IWS queries the Ad Database to determine if there are other existing advertiser's whose profile matches that of the new advertiser 1018. The IWS then creates an Ad Confirmation Page 1020. If the query finds one or more ads that match, the Ad Confirmation Page displays a text message of the number of matching ads 1027. The text message is displayed as a hyper-link which can be followed by a browser to the actual matching ads. In addition, the Ad Confirmation Page 1020 confirms the advertiser's mailbox number 1021, and gives the advertiser an e-mail address to submit an audio greeting 1022, photograph 1023, or video clip 1024 for inclusion with her personal ad. Also, the Internet Web Server stores the date and time the ad is taken in the field AD_DATE_TIME 206, and updates the field AD_ORIGIN 211 to indicate that the personal ad originated on the Internet 1025. Finally, In addition, the IWS creates an electronic mailbox for the advertiser 1026, using the mailbox number stored in the field AD_MAILBOX_NUMBER as the electronic mail address, to allow respondents to submit audio, video and photographic files in response to the advertiser's ad.

In addition, the mailbox numbers of matching ads are placed in a notification queue 1038, together with delivery information corresponding to the matching ad so that the existing advertisers can be notified that a new personal ad has come onto the system that matches the existing advertisers' profile. The delivery information includes the telephone number and e-mail address, if available, of the existing advertiser to be notified, together with mailbox number of the new ad coming onto the system.

Enhancing an Internet Ad with Audio, Photograph and Video

A more detailed explanation of how an advertiser submits an audio greeting, photograph, or video clip via CT1 will now be given. To submit an audio greeting, the advertiser first makes an audio recording using a WAV file editor and then saves the file using her five digit mailbox number as the file name 1030 FIG. 7, for example: 44567.wav. The advertiser then submits the audio file using e-mail to an audio greeting electronic mailbox 1031. The advertiser's audio recording is stored to a disk file on the Internet Web Server.

In addition, a new record is created in the AD_GREETINGS_TABLE of FIG. 3 and the Ad Database is updated 1032. Specifically, the field GR_REVIEW_FLAG 303 is set to FALSE to indicate that the audio greeting has not been reviewed. Also, the fields GR_MAILBOX_NUMBER 301, GR_TYPE 302, GR_FILENAME 304, GR_DATE_TIME 305 in the AD_GREETINGS_TABLE of FIG. 3 are also populated to indicate the advertiser's mailbox number, the format of the audio file, and the location of the audio file on the IWS, and the date and time the greeting placed. The field GR_TYPE is set to WAV to indicate that the audio recording is in the Microsoft .WAV file format. Finally, the field GR_CONVERSION_FLAG 306 is set to FALSE to indicate that the audio file must be converted from the Microsoft .WAV format to create two new audio files: one in the RealAudio .RA format for playback on the Internet, and another in the Dialogic .VOX format for playback via the telephone.

To enhance a personal ad with a photograph, the advertiser first digitizes a photograph using a scanner or takes a photograph with a digital camera and then saves the image to a .GIF file using her five digit mailbox number as the file name 1037, for example: 44567.gif. The advertiser then submits the graphic file using e-mail to an photograph electronic mailbox 1031.

The advertiser's photo is stored to a disk file on the IWS and the Ad Database is updated 1032. Specifically, a new record is created in the AD_GREETINGS_TABLE of FIG. 3 and the field GR_REVIEW_FLAG 303 set to FALSE to indicate that the graphic file has not been reviewed. In each new record, the fields GR_MAILBOX_NUMBER 301, GR_TYPE 302, GR_FILENAME 304, GR_DATE_TIME 305 in the AD_GREETINGS_TABLE of FIG. 3 are also populated to indicate the advertiser's mailbox number, the format of the graphic file, and the location of the graphic file on the IWS, and the date and time the photograph was received. The field GR_TYPE 302 is set to GIF to indicate that the graphic file is in the .GIF file format. Finally, the field GR_CONVERSION_FLAG 306 is set to TRUE to indicate that no file conversion is necessary as .GIF is the graphic file format used by the IWS. If other graphic formats were accepted, they might have to be converted to a .GIF format, depending on the file formats supported by the IWS. If file conversion were necessary, the field GR_CONVERSION_FLAG 306 would be set to FALSE.

To enhance a personal ad with video, the advertiser first digitizes a video clip and then saves the image to a Microsoft .AVI file using her five digit mailbox number as the file name 1037, for example: 44567.avi. Other video formats such as Apple Quicktime, or MPEG video could also be used. The advertiser then submits the graphic file using e-mail to an electronic mailbox 1031.

The advertiser's video clip is stored to a disk file on the IWS and the Ad Database is updated 1032. Specifically, a new record is created in the AD_GREETINGS_TABLE of FIG. 3 and the field GR_REVIEW_FLAG 303 set to FALSE to indicate that the video file has not been reviewed. In each new record, the fields GR_MAILBOX_NUMBER 301, GR_TYPE 302, GR_FILENAME 304, GR_DATE_TIME 305 in the AD_GREETINGS_TABLE of FIG. 3 are populated to indicate the advertiser's mailbox number, the format of the video file, and the location of the video file on the IWS, and the date and time the video was received. Specifically, the field GR_TYPE 302 is set to AVI to indicate that the video clip is in the Microsoft .AVI file format. Finally, the field GR_CONVERSION_FLAG 306 is set to FALSE to indicate that the video file must be converted to the VDOLive format for real time playback on the Internet.

Notifying an Existing Advertiser of New Matches

Figure 8:
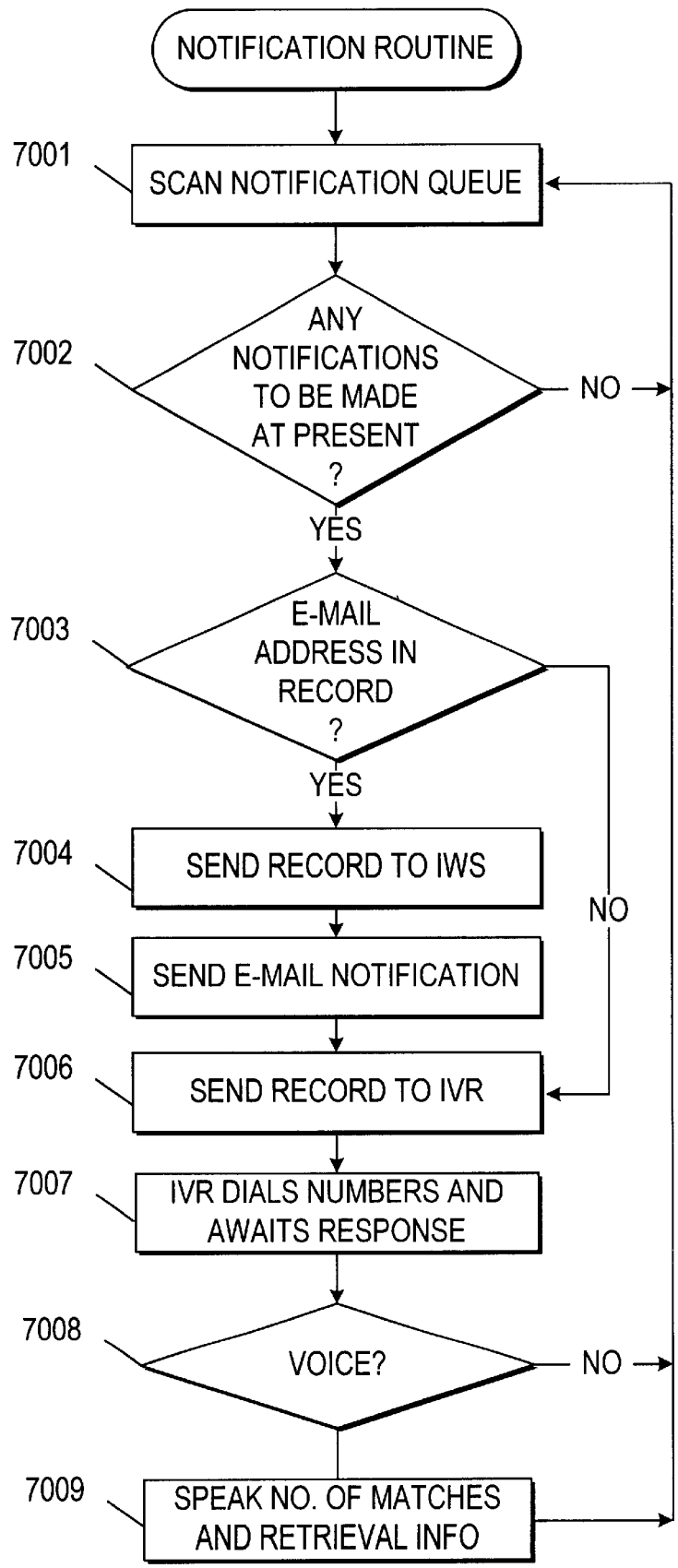
FIG. 8 shows a flow diagram of an exemplary operation of the process of notifying an existing advertiser of new matches as accomplished by the present invention.

FIG. 8 illustrates the notification routine that processes the records placed in the notification queue in step 836 of FIG. 6 and step 1038 of FIG. 7. In step 7001, the DBS scans the notification queue to determine if any notifications are scheduled to be made at the present time. As previously described, each notification record includes the telephone number and e-mail address, if available, of the advertiser to be notified, together with the mailbox number of the new matching personal ad that has come onto the system. In step 7003, the DBS scans the notification record for an e-mail address. If an e-mail address is present, the DBS sends the record to the IWS 7004. In step 7005, the IWS sends an e-mail message to the advertiser informing him that a new ad has come onto the system that matches his profile. The e-mail message includes the mailbox number of the new ad. The mailbox number is also a link that can be followed to the actual ad for those retrieving their e-mail via a browser. Step 7006 sends the record to the IVR. In step 7007, the IVR dials an advertiser's telephone number contained in the callback record and waits for a response. If a voice response is not received, then the IVR sends a corresponding message to the DBS. The DBS then marks the time of the attempted callback in the notification queue record, so that a set period of time can be established between callback attempts. A note could also be made if an e-mail message had been sent to avoid sending duplicate notifications. If a voice response is received 7008, then, in step 7009, the IVR sends a voice message informing the person that a new ad has come onto the system that matches the person's profile. The voice message also gives a 900 number and Internet address that can be used to receive the match. It may be desirable in certain applications to prompt the person who answers the telephone for a password and mailbox number to verify their identity. Also, it may be desirable to actually allow the person to listen and respond to his match during the call.

Advertiser Matching Via Telephone

Figure 9:
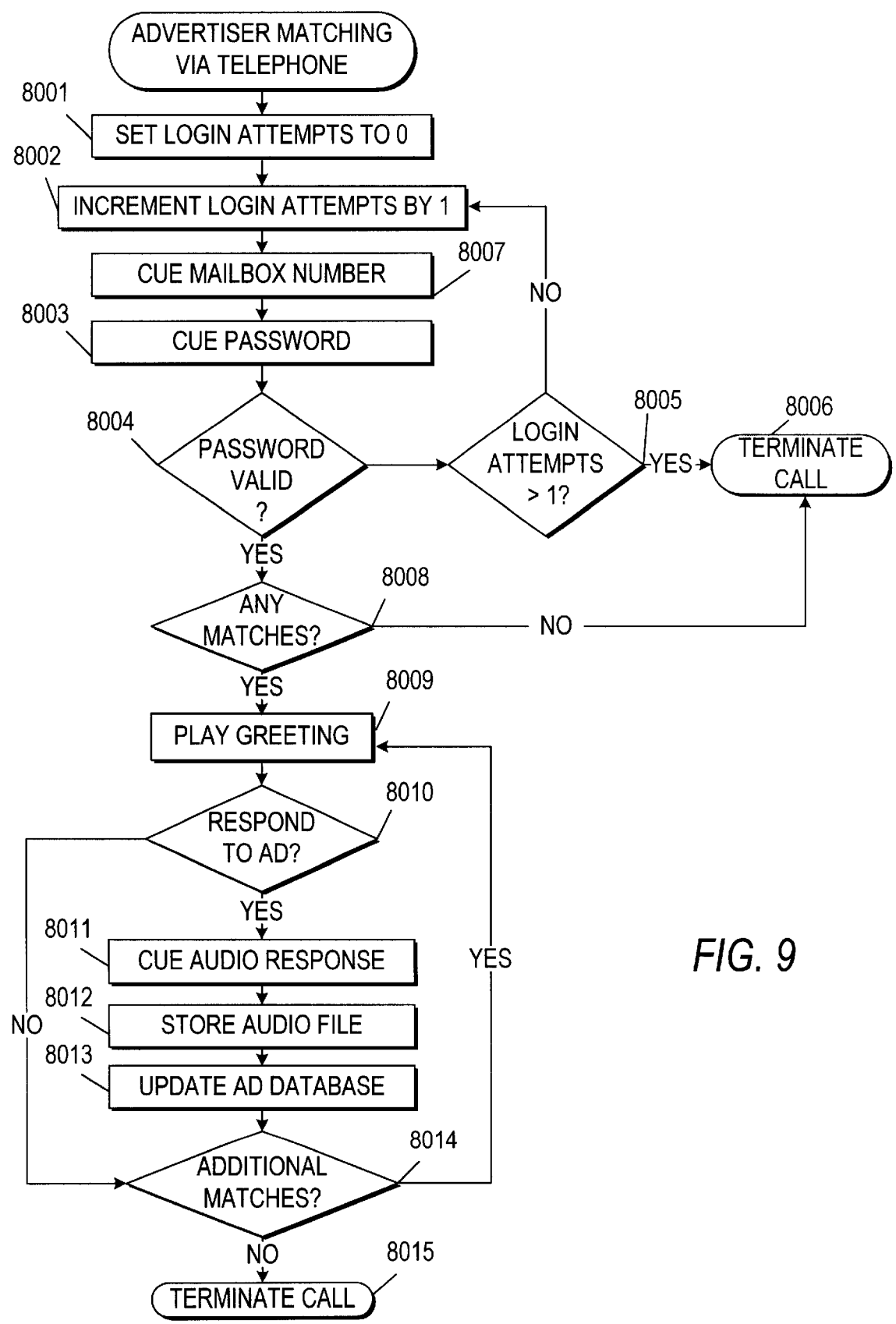
FIG. 9 shows a flow diagram of an exemplary operation of the process of advertiser matching through a telephone as accomplished by the present invention.

An exemplary operation of the system of the present invention, with regard to an advertiser retrieving personal ads that match his preferences will now be treated to accomplish the process as indicated in FIG. 9. First, suppose a telephone caller at terminal T1 places a call to retrieve matches after having placed a personal ad or after having been notified of the existence of a new personal ad that match his preferences. The assumed call involves the advertiser actuating the buttons to input the number 1 900 777 4444, for example. As a result, signals are provided to the PTN resulting in a connection from the remote terminal T1 to the IVR. Using standard DNIS techniques, the IVR associates the called number 1 900 777 4444 with a specific format, for example, a match retrieval format.

Referring to FIG. 9, upon receiving a call, the IVR sets the "logon attempts" equal to zero 8001. The IVR then increments the "logon attempts" by one 8002 and cues the caller for a mailbox number 8007 and password 8003. The IVR then queries the Ad Database to determine if the mailbox number and password are valid 8004. If the entries are not valid, the IVR determines if the caller has exceeded the maximum number of logon attempts allowed 8005. If the caller has exceeded the maximum number of logon attempts allowed, the call is terminated 8006. If the maximum number of logon attempts allowed has not been exceeded, the IVR increments the "logon attempts" by one 8002 and again cues the caller for a mailbox number and password 8003.

If the entries are valid, the IVR then queries the Ad Database for existing ads whose profile matches that of the caller 8008. If there are no matches, the call is terminated 8006. If the IVR finds a match, the IVR plays the greeting of the matching ad 8009. If the greeting is in text form, the IVR uses text to speech to play the message. The IVR then prompts the caller to indicate if he wishes to respond to the ad 8010.

If the caller elects not to respond to the ad and there are no additional matches, the call is terminated 8015. If the caller elects not to respond to the ad and there are additional matches, the caller is returned to block 8009.

If the caller elects to respond to the ad, the IVR next cues him to record his response 8011. The IVR then stores the response to a disk file 8012 and updates the Ad Database 8013. Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR creates a new RealAudio .RA file from the Dialogic .VOX file and stores the RealAudio file to a disk file on the IWS and updates the Ad Database. Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to RA to indicate that the audio recording is in the RealAudio .RA file format.

Finally, the field RSP_CONVERSION_FLAG 506 is set to TRUE for both the audiotext .VOX file and the RealAudio .RA file to indicate that the audio files do not need to be converted.

If there are additional matches, the caller is returned to block 8009. Otherwise, the call is terminated 8015.

Advertiser Matching Via the Internet

Figure 10:
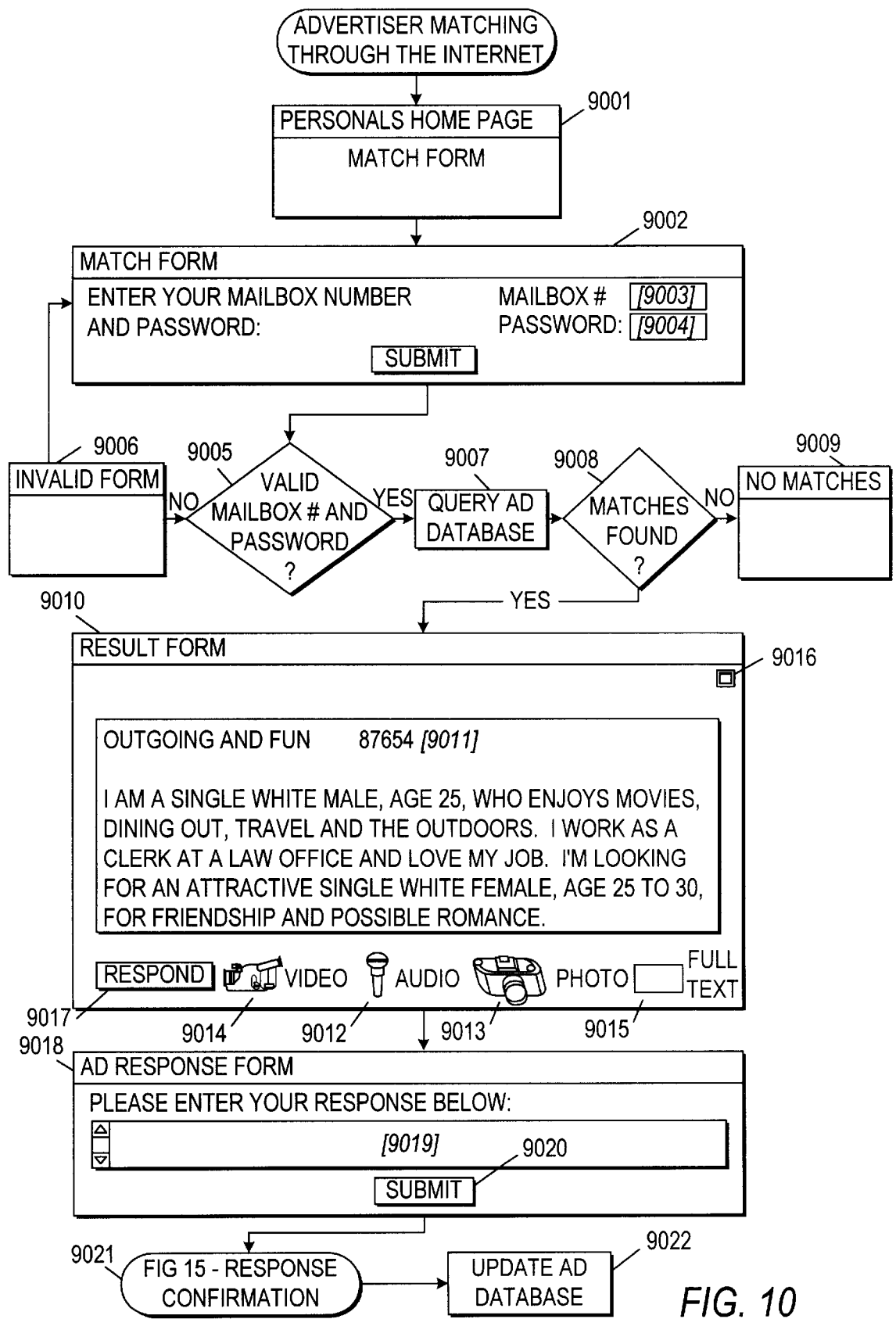
FIG. 10 shows a flow diagram of an exemplary operation of the process of advertiser matching through the Internet as accomplished by the present invention.

An exemplary operation of the system of the present invention, with regard to a specific advertiser retrieving her matches via the Internet will now be treated to accomplish the process as indicated in FIG. 10. First, suppose an advertiser at terminal CT1 connects to the Internet to find existing ads that match her profile. The assumed advertiser connects to the Internet and inputs a Uniform Reference Locator URL, resulting in a connection from the remote terminal CT1 to a Home Page 1301 on the Internet Web Server.

Referring to FIG. 10, from the Home Page 9001 on the Internet Web Server, the Internet user selects a Match Form 9002. The Match Form 9002 instructs the advertiser to enter a mailbox number 9003 and password 9004. The IWS then queries the Ad Database to determine if the mailbox number and password are valid 9005. If the entries are not valid, the Internet user is presented with an Invalid Mailbox and Password Form 9006. If the entries are valid, the TWS queries the Ad Database 9007 to find existing ads whose profile matches that of the advertiser.

If the query does not find any matching ads, the advertiser is presented with a No Matches Page 9009. If the query finds one or more matching ads, the IWS presents the advertiser with a Results Form 9010. The Results Form 9010 shows the matching ads. Specifically, the Results Form shows the twenty word text ad that appears in the newspaper 9011. In addition, each ad contains one or more icons that represent any additional text or multimedia files (audio, video, photograph) for the ads that are available on the IWS. These icons include an audio icon 9012 to denote the ad's audio greeting, a still camera icon 9013 to denote a photograph of the advertiser, a video camera icon 9014 to denote a video clip of the advertiser, or a paper icon 9015 to denote the ad's full text greeting, if the ad was placed on the Internet. It is to be understood that these icons are merely representative and that many other possibilities exist to denote the existence of text and multimedia files. By clicking on an icon, the Internet user can view or listen to the associated file. In addition, by selecting a maximize bar 9016, the Internet user can expand an ad to a full page size, see FIG. 15.

The Internet user responds to an ad by selecting the "Respond" button 9017. When the Internet user selects the respond button, she is presented with an Ad Response Form 9018. The Internet user creates a response by typing in a response text field 9019. After completing the Ad Response Form, the Internet user submits the form by pressing the "Submit" button 9020. The advertiser is then presented with a Response Confirmation Form 9021. The Response Confirmation Form gives the advertiser information on enhancing her response with an audio message, photograph, or video clip.

The IWS then stores the response to a disk file and updates the Ad Database 9022. Specifically, the IWS creates a new record in the AD_RESPONSE_TABLE of FIG. 5 and then populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format.

The Internet user can return to the Results Form by using the "Back" key on her browser.

Reviewing and Summarizing Ads

All new personal ads are reviewed by an operator at an OW to insure that their content is appropriate. Also, each greeting submitted by an advertiser, whether it be an audio greeting recorded by an advertiser via a telephone or a text greeting placed by an advertiser via the Internet, is summarized by an operator to create a twenty word classified text ad for publication in a newspaper. The twenty word limit is a function of newspaper imposed space limitations. It should be noted that space limitations, if they exist at all, may vary widely from newspaper to newspaper. In another format, text ads that are published in the newspaper are first placed with a live operator via a telephone, precluding the need to summarize an audio recording.

Figure 11:
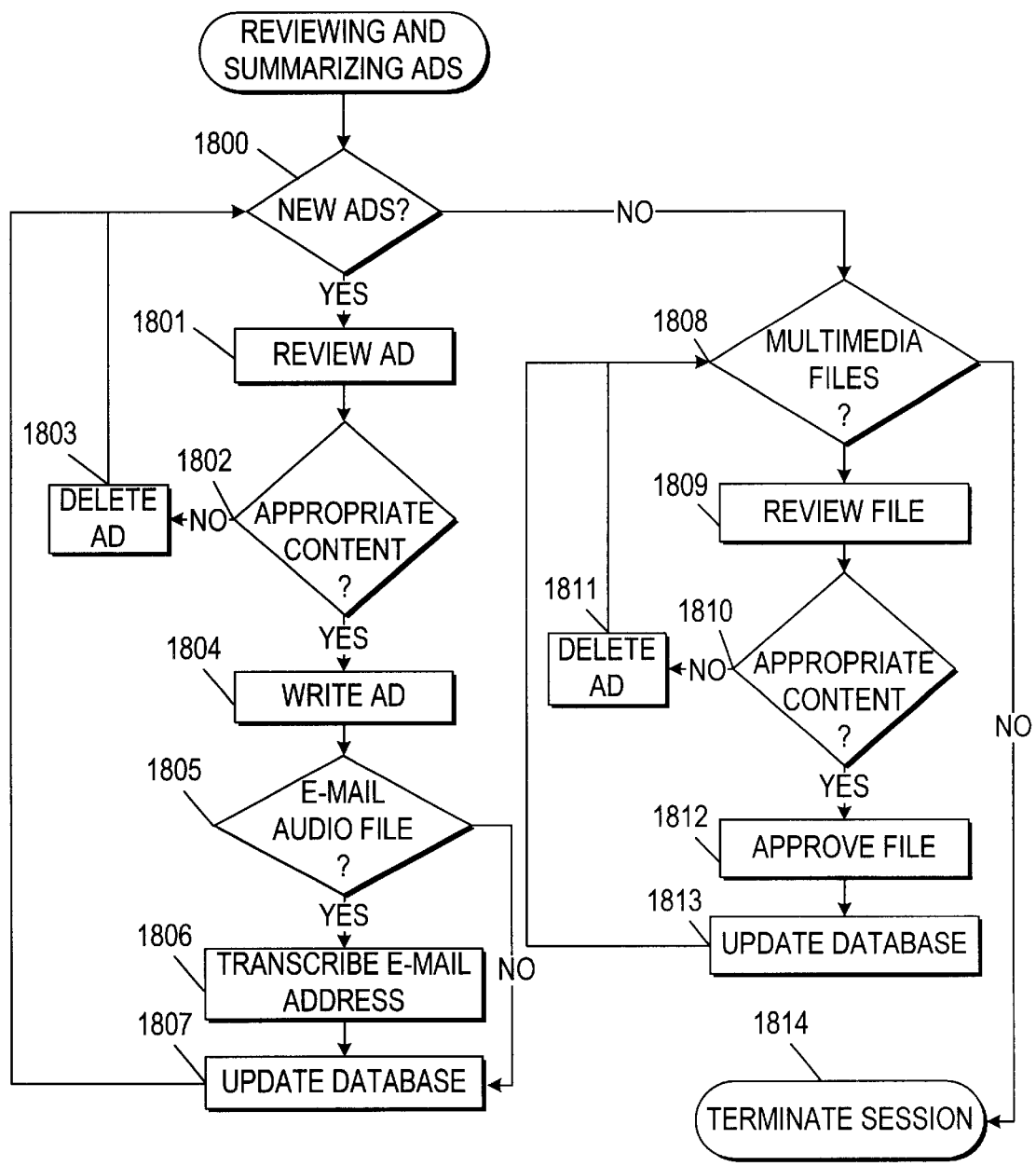
FIG. 11 shows a flow diagram of an exemplary operation of the process of reviewing and summarizing ads as accomplished by the present invention.

An exemplary operation of the process of reviewing and summarizing ads with regard to a specific operator at OW1 will now be treated to accomplish the process as indicated in FIG. 11. The operator first queries the Ad Database to determine if there are new ads to review 1800. Specifically, the query looks for all ads in the AD_PERSONAL_TABLE of FIG. 2 where the field AD_REVIEW_FLAG 210 is set to FALSE. If the query finds a new ad, the operator first reviews the ad's greeting 1801 as found in the AD_GREETINGS_TABLE of FIG. 3. If the ad was placed via telephone, this consists of listening to the ad's audio greeting. If the ad was placed via the Internet, this consists of reading the text greeting. The operator then determines if the greeting's contents are appropriate 1802. If the greeting's contents are inappropriate, the ad is deleted and the record purged from the Ad Database 1803 and the operator is returned to block 1800. If the greeting's contents are appropriate, the operator writes a twenty word summary of the greeting 1804. The operator then queries the Ad Database to determine if the advertiser recorded an e-mail address 1805. If an e-mail address audio recording is found, the operator transcribes the e-mail address 1806. The operator then updates the Ad Database 1807.

Specifically, the advertiser's twenty word text summary is stored to a disk file on the IWS. The AD_REVIEW_FLAG 210 in the AD_PERSONAL_TABLE of FIG. 2 is set to TRUE indicating that the ad has been reviewed. In addition, a new record for the text summary is created in the AD_GREETINGS_TABLE of FIG. 3 and the field GR_REVIEW_FLAG 303 set to TRUE indicating that the record has been reviewed. In the new record, the fields GR_MAILBOX_NUMBER 301, GR_TYPE 302, GR_FILENAME 304, GR_DATE_TIME 305 in the AD_GREETINGS_TABLE of FIG. 3 are also populated to indicate the advertiser's mailbox number, the file format, and the location of the text file on the IWS, and the date and time. The field GR_TYPE is set to TEXT. Finally, the field GR_CONVERSION_FLAG 306 is set to TRUE to indicate that the text does not need to be converted to a different format.

The operator then returns to block 1800 to continue processing ads. If no new ads are found, the operator queries the Ad Database to determine if any multimedia files (audio, video, or photo) have been submitted via the Internet to enhance a personal ad 1808. Specifically, the query looks for all ads in the AD_PERSONAL_TABLE of FIG. 2 where the field AD_REVIEW_FLAG 210 is set to TRUE that has files in the AD_GREETING_TABLE of FIG. 3 where the GR_REVIEW_FLAG 303 is set to FALSE. If the query finds a multimedia file, the operator first reviews the file 1809. If it is an audio file, this consists of listening to the ad's audio greeting. If it is a video or graphic file, this consists of viewing the file. The operator then determines if the greeting's contents are appropriate 1810. If the greeting's contents are inappropriate, the file is deleted and the record purged from the Ad Database 1811. The operator is then returned to block 1808 to continue processing multimedia files. If the file's contents are appropriate, the operator approves the file 1812 and updates the Ad Database 1813. Specifically, this consists of setting the field GR_REVIEW_FLAG 303 to TRUE to indicate that the file has been reviewed.

If the file is an audio file, the OW converts the file to create a new RealAudio RA file and stores the file on the IWS. The OW also converts the file to create a Dialogic VOX file and stores the file on the IVR. For each new audio file, a new record is created in the AD_GREETINGS_TABLE of FIG. 3 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the audio file on the IVR. Also, the field GR_REVIEW_FLAG 303 is set to TRUE to indicate that the file has been reviewed. Finally, the field GR_CONVERSION_FLAG is set to TRUE to indicate that the audio file does not need to be converted.

If the file is a video file, the OW converts the Microsoft AVI file to create a new VDOLive file and stores the file on the IWS. Also, a new record is created in the AD_GREETINGS_TABLE of FIG. 3 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the video file on the IVR. Also, the field GR_REVIEW_FLAG 303 is set to TRUE to indicate that the file has been reviewed. Finally, the field GR_CONVERSION_FLAG 306 is set to TRUE to indicate that the video file does not need to be converted.

The operator then returns to block 1808 to continue processing multimedia files. If no new multimedia files are found, the session is terminated 1814.

Publishing Ads in the Newspaper

Each week, all the twenty-word summary text ads from personal ads submitted via telephone and via the Internet are published in a newspaper along with their five digit mailbox numbers. FIG. 12 depicts personal ads as they would appear in the local newspaper. Icons are included in each ad that represent the origin of an ad (via telephone or via the Internet) and what additional information or multimedia, if any, is available on the Internet. For example, an ad placed via the telephone contains a telephone icon 2001; an ad placed via the Internet contains a computer icon 2002. If there is additional text on the Internet, an ad contains an icon denoting additional text 2003. The presence of a photo or video clip is indicated respectively by a still camera 2004 and video camera 2005 icons.

Responding to an Ad Through a Telephone

Figure 13:
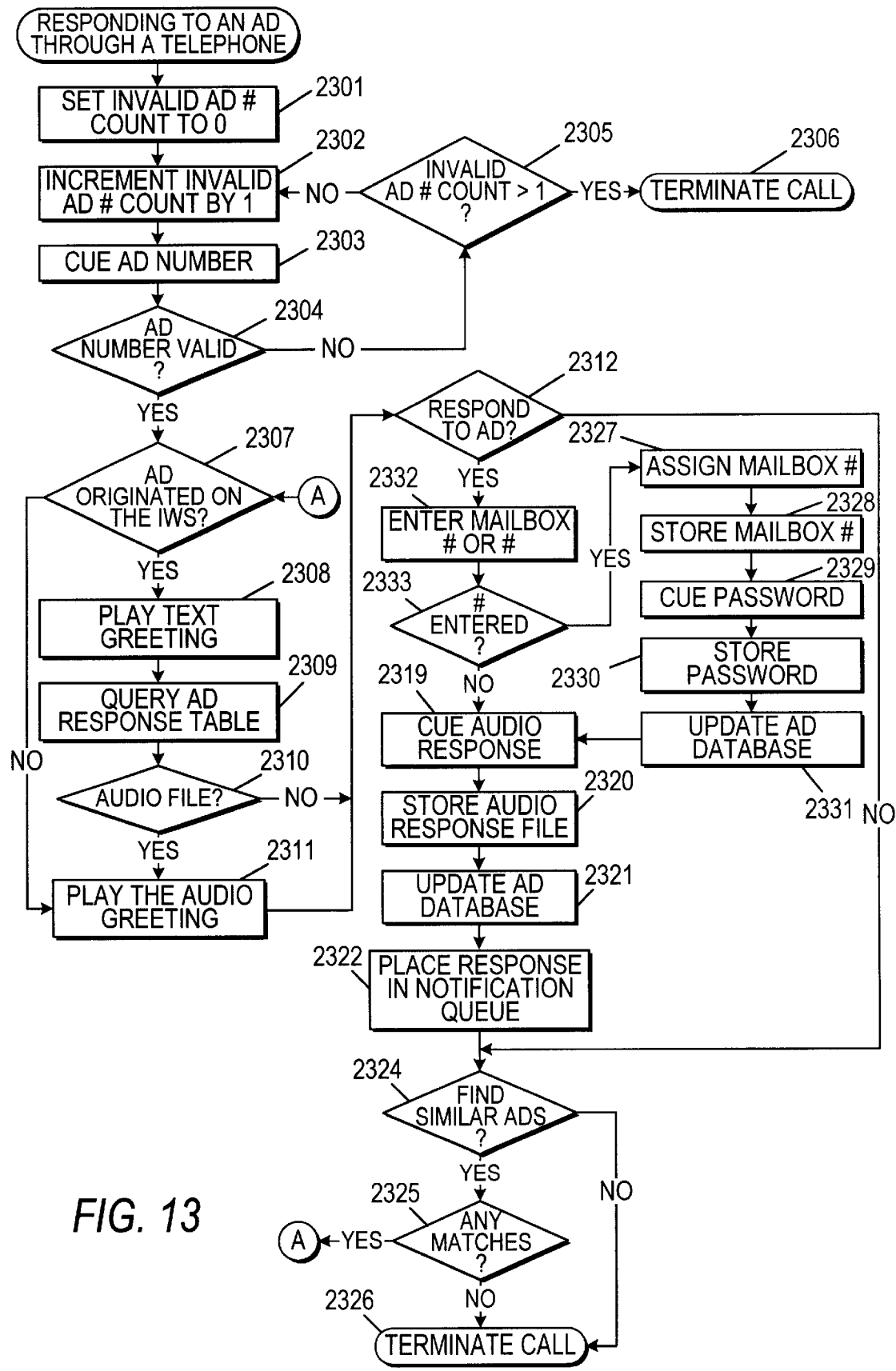
FIG. 13 shows a flow diagram of an exemplary operation of the process of responding to an ad through a telephone as accomplished by the present invention.

An exemplary operation of the system of the present invention, with regard to a telephone caller responding to a personal advertisement will now be treated to accomplish the process as indicated in FIG. 13. First, suppose a telephone caller at terminal T1 places a call to respond to a personal ad advertised in XYZ newspaper. The assumed call involves the telephone caller actuating the buttons to input the number 1 900 777 3333, for example. As a result, signals are provided to the PTN resulting in a connection from the remote terminal T1 to the IVR. Using standard DNIS techniques, the IVR associates the called number 1 900 777 3333 with a specific format, for example, a voice personals response format.

Referring to FIG. 13, upon receiving a call, the IVR sets the "invalid mailbox number count" equal to zero 2301. The IVR then increments the "invalid mailbox number count" by one 2302 and cues the caller for a mailbox number 2303. Upon the caller entering a mailbox number, the IVR queries the field AD_MAILBOX_NUMBER 201 to determine if the mailbox number is valid 2304. If the mailbox number is invalid, the IVR determines if the caller has exceeded the maximum number of attempts allowed 2305. If the caller has exceeded the maximum number of attempts allowed, the call is terminated 2306. If the maximum number of attempts allowed has not been exceeded, the IVR increments the "invalid mailbox number count" by one 2302 and again cues the caller for a mailbox number 2303.

If the mailbox number is valid, the IVR queries the field AD_ORIGIN 211 to determine if the ad originated on the Internet 2307. If the ad originated on the telephone, the IVR plays the ad's audio greeting 2311. If the ad originated on the Internet, the IVR uses text to speech to play the ad's text greeting as placed on the Internet 2308. The IVR then queries the AD_GREETINGS_TABLE of FIG. 2 to determine if the Internet advertiser also submitted an audio greeting 2309. If the query does not find an audio greeting 2310, the IVR prompts the caller to indicate if he wishes to respond to the ad 2312. If the query finds an audio greeting 2310, the IVR plays the audio greeting 2311. The IVR then prompts the caller to indicate if he wishes to respond to the ad 2312.

If the caller elects not to respond to the ad, he is given the option of having the IVR find other ads that are similar to the one he just listened to 2324. If the caller elects to respond to the ad, the IVR cues the caller to enter his five digit mailbox number or to enter "#" if he does not have a mailbox number 2332. If the caller indicates that he does not have a mailbox number by entering the "#" key, the IVR assigns the respondent a five digit mailbox number 2327. For example. "Your five digit mailbox number is 54321." The mailbox number is then stored 2328 in the field PR_MAILBOX_NUMBER 401. The IVR then cues the respondent to enter a five digit password 2329. The password is then stored 2330 in the field PR_PASSWORD 402. The Ad Database is then updated 2331 to include the date and time the mailbox is created.

The IVR first cues the caller to record his response 2319. The IVR then stores the response to a disk file and updates the Ad Database 2321. Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR also creates a new RealAudio .RA file from Dialogic .VOX file and stores the RealAudio file to a disk file on the IWS. Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to RA to indicate that the audio recording is in the RealAudio .RA file format. Finally, the field RSP_CONVERSION_FLAG 506 is set to TRUE for both the audiotext .VOX file and the RealAudio .RA file to indicate that the audio files do not need to be converted.

In addition, the mailbox number of the personal ad responded to is placed in a notification queue 2322, together with delivery information corresponding to the ad, so that the advertiser can be notified that a response has been left for her ad. The delivery information includes the telephone number and e-mail address, if available, of the advertiser to be notified.

The caller is then asked if he wants the IVR to automatically find other ads that are similar to the one he just responded to 2324. If the caller declines this option, the call is terminated 2326.

Response Matching Via Telephone

If the caller chooses to have the IVR find other matching ads, the IVR queries the Ad Database to find other ads that are similar to the ad selected by the caller. Specifically, an ad is deemed to be similar if the age in the ad's profile is within five years of the profile of the ad selected by the caller and if the ads have the same gender and marital status. Its is to be understood that the criteria used to determine a similar ad could vary greatly in kind and quantity.

If the query does not find any matches, the call is terminated 2326. If the query returns a match, the caller is returned to block 2307 for processing.

Responding to an Ad Through the Internet

Figure 14:
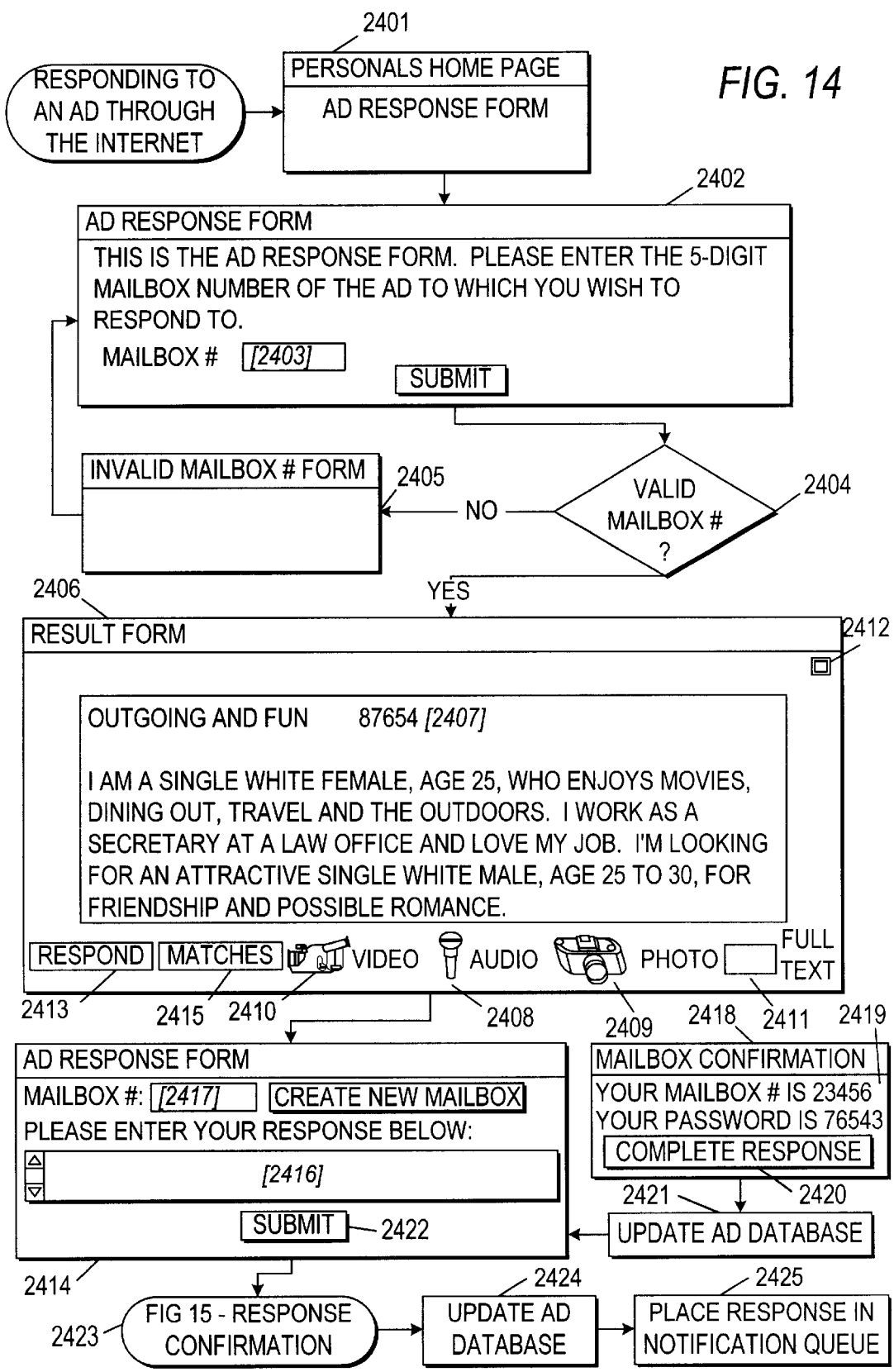
FIG. 14 shows a flow diagram of an exemplary operation of the process of responding to an ad through the Internet as accomplished by the present invention.

An exemplary operation of the system of the present invention, with regard to a specific Internet user responding to a personal ad via the Internet will now be treated to accomplish the process as indicated in FIG. 14. First, suppose an advertiser at terminal CT1 connects to the Internet to respond to a personal advertisement advertised in XYZ newspaper. The assumed Internet user connects to the Internet and inputs a URL resulting in a connection from the remote terminal CT1 to a Home Page 2401 on the IWS.

Referring to FIG. 14, from the Home Page 2401 on the IWS, the Internet user selects an Ad Response Form 2402. The Ad Response Form instructs the Internet user to enter the five digit mailbox number of the ad she wishes to respond to 2403. Upon the Internet user entering her mailbox number, the IWS queries the field AD_MAILBOX_NUMBER in the Ad Database to determine if the mailbox number is valid 2404. If the mailbox number is invalid, the Internet user is presented with an Invalid Mailbox Number Form 2405.

Figure 15:
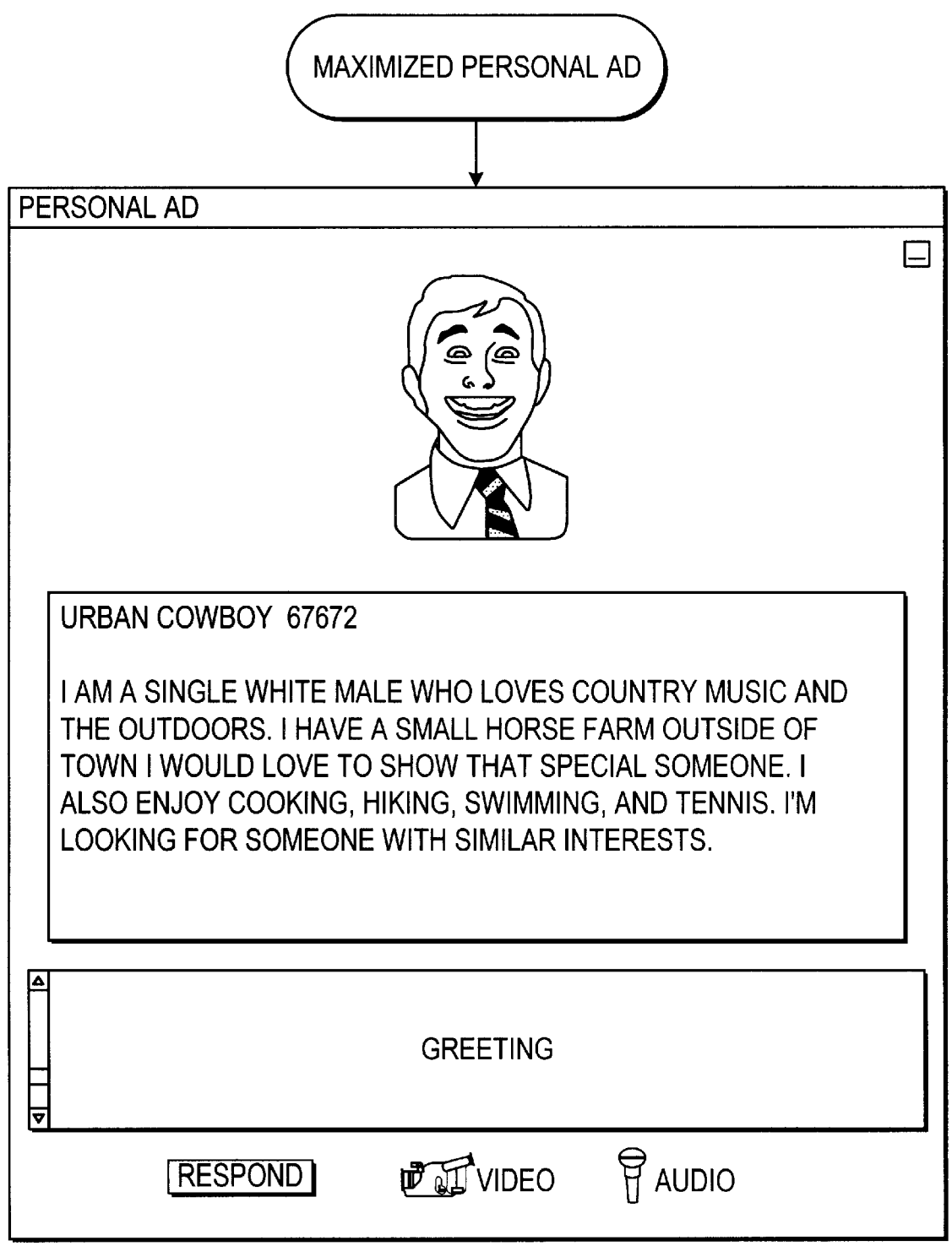
FIG. 15 shows a maximized personal ad as seen by the Internet user who chooses to expand the ad to full-page size.

If the mailbox number is valid, the IWS presents the Internet user with a Results Form 2406. The Results Form 2406 shows the ad the Internet user selected. Specifically, the Results Form shows the twenty word text ad that appears in the newspaper 2407. In addition, the ad contains one or more icons that represent any additional text or multimedia files (audio, video, photograph) for the ad that are available on the IWS and a link to other ads that match the ad to which the Internet user is responding. These icons include an audio icon 2408 to denote the ad's audio greeting, a still camera icon 2409 to denote a photograph of the advertiser, a video camera icon 2410 to denote a video clip of the advertiser, a paper icon 2411 to denote the ad's full text greeting, if the ad was placed on the Internet, and a matching icon to denote that the IWS has identified other ads that are similar to the one being responded to 2415. It is to be understood that these icons are merely representative and that many other possibilities exist to denote the existence of text and multimedia files. By clicking on an icon, the Internet user can view or listen to the associated file. In addition, by selecting a maximize bar 2412, the Internet user can expand an ad to full page size, as shown in FIG. 15. The Internet user responds to an ad by selecting the "Respond" button 2413.

When the Internet user selects the respond button, she is transferred to an Ad Response Form 2414. The Ad Response Form instructs the Internet user to enter her five digit mailbox number 2417 and to complete the response text field 2416.

If the Internet user does not have a mailbox number, she is instructed to create one by selecting the "Create New Mailbox" button 2426. After selecting the "Create New Mailbox" button, the Internet users is presented with a Mailbox Confirmation Page 2418 that assigns the Internet user a five digit mailbox number and a five digit password 2419. By selecting the "Complete Response" button 2420, the Internet user can return to the Ad Response Form 2414. The IWS then updates the Ad Database. Specifically, the IWS stores the Internet user's new mailbox number and password to the fields PR_MAILBOX_NUMBER 401 and PR_PASSWORD 402 in the AD_PERSONAL_RESPONSE_TABLE of FIG. 4 2421 along with the date and time the new mailbox is created.

Figure 16:
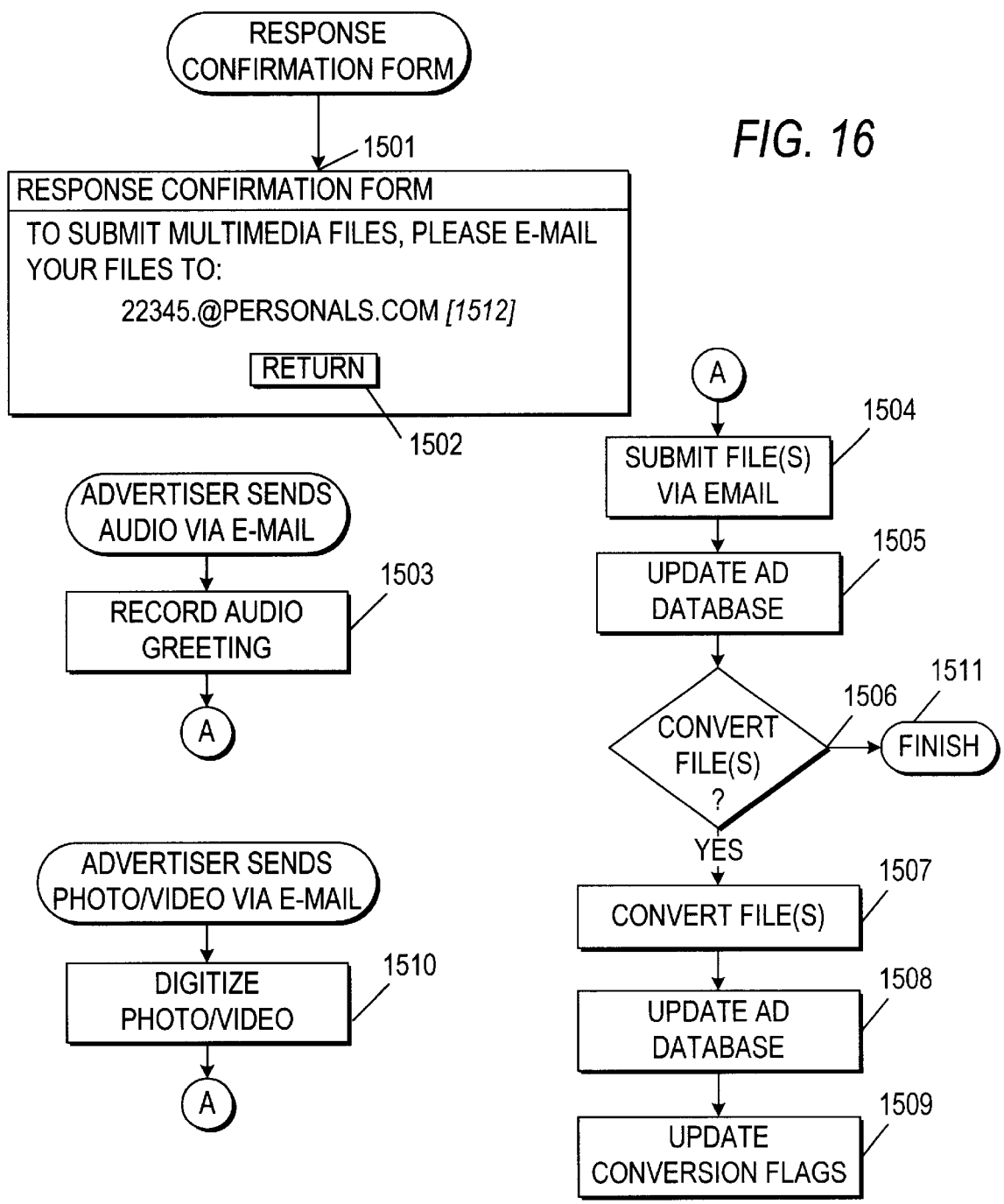
FIG. 16 shows a flow diagram of the response confirmation process, including the Response Confirmation Form which gives the Internet user instructions on how to enhance a response to an ad with, audio, video or a photograph.

After completing the Ad Response Form, the Internet user submits the form by pressing the "Submit" button 2422. The advertiser is then presented with a Response Confirmation Form 2423 which is illustrated in FIG. 16. The Response Confirmation Form gives the advertiser information on enhancing her response with an audio message, photograph, or video clip.

The IWS then stores the response to a disk file and updates the Ad Database 2424. Specifically, the IWS creates a new record in the AD_RESPONSE_TABLE of FIG. 5 and populates the fields RSP_MAILBOX_NUMBER 501, RSP_RMAILBOX_NUMBER 501, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format.

In addition, the mailbox number of the personal ad responded to is placed in a notification queue 2425, together with delivery information corresponding to the ad, so that the advertiser can be notified that a response has been left for her ad. The delivery information includes the telephone number and e-mail address, if available, of the advertiser to be notified.

Enhancing a Response with Audio, Photograph and Video

As already indicated, after a text response has been submitted via the Internet, the Internet user is shown a Response Confirmation Form 1501 as shown in FIG. 16. The response confirmation form gives the Internet user instructions on how to enhance a response to an ad with audio, video, or a photograph.

A more detailed explanation of how a respondent submits an audio response, photograph, or video clip via CT1 will now be given. To submit an audio response, the Internet user first makes an audio recording using a WAV file editor and then saves the file 1503, for example: response.wav. The Internet user then submits the audio file using e-mail to the recipient's electronic mailbox on the IWS 1504 1512. The Internet user's audio response is stored to a disk file on the IWS and the Ad Database is updated 1505.

Specifically, the IVR creates a new record in the AD_RESPONSE_TABLE of FIG. 5 and populates the fields RSP_MAILBOX_NUMBER 501, RSP_RMAILBOX_NUMBER 501, RSP_DATE_TIME 503, RSP_TYPE 504, and RSP_FILENAME 506 to indicate the mailbox number of the ad responded to, the mailbox of the respondent, the date and time of the response, the format of the audio file, and the location of the audio file on the IVR. The field RSP_TYPE 504 is set to WAV to indicate that the audio recording is in the Microsoft .WAV file format. Also, the field RSP_CONVERSION_FLAG 506 is set to FALSE to indicate that the audio file must be converted from the Microsoft .WAV format to create two new audio response files: one in the RealAudio .RA format for playback on the Internet, and another in the Dialogic .VOX format for playback via the telephone.

The IWS determines if conversion of audio files is needed 1506, and then creates a new RealAudio .RA file and Dialogic .VOX file from the Microsoft .WAV file 1507. The RealAudio file is stored on the IWS and the Dialogic file is stored on the IVR. The IWS also updates the Ad Database 1508. Specifically, for each new audio file, the IWS creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox of the respondent, the date and time of the response, the format of the response, and the location of the response file on the IWS. Finally, the field RSP_CONVERSION_FLAG 506 is set to TRUE for both the source audio file (.WAV) and the target audio files (.VOX and .RA) to indicate that the audio files do not need to be converted 1509.

To send a photograph in response to an ad, the Internet user first digitizes a photograph using a scanner or takes a photograph with a digital camera and then saves the image to a .GIF file, for example: response.gif 1510. The respondent then submits the graphic file using e-mail to the recipient's electronic mailbox 1504. The respondent's photo is stored to a disk file on the IWS and the Ad Database is updated 1505.

Specifically, the IWS creates a new record in the AD_RESPONSE_TABLE of FIG. 5 and populates the RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the file format of the photograph, and the location of the file on the IWS. The field RSP_TYPE 504 is set to GIF to indicate that the graphic file is in the .GIF file format. Finally, the field RSP_CONVERSION_FLAG 506 is set to TRUE to indicate that no file conversion is necessary as .GIF is the graphic file format used by the IWS 1506. It should be noted that file conversion may or may not be necessary depending on what file formats are supported by the IWS and IVR and in which formats the system allows users to submit files.

To send an advertiser a video clip, the Internet user first digitizes a video clip and then saves the image to a Microsoft .AVI file 1510, for example: 44567.avi. Other video formats such as Apple Quicktime, or MPEG video could also be used. The respondent then submits the graphic file using e-mail to the recipient's electronic mailbox 1504. The respondent's video is stored to a disk file on the IWS and the Ad Database is updated 1505.

Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the file format of the video clip, and the location of the video file on the IWS. Specifically, the field RSP_TYPE 504 is set to AVI to indicate that the audio recording is in the Microsoft .AVI file format. Finally, the field RSP_CONVERSION_FLAG 506 is set to FALSE to indicate that the VDOLive file must be converted to the VDOLive format for real time playback on the Internet.

The IWS determines that the video file must be converted to VDOLive format 1506. The IWS creates a new VDOLive file from the Microsoft AVI file and stores the new file to a disk file 1507 on the IWS and updates the Ad Database 1508. A new record in the AD_RESPONSE_TABLE of FIG. 5 is created and the IWS populates the RSP_MAILBOX_

NUMBER 501, RSP_RMAILBOX_NUMBER 502, RSP_DATE_TIME 503, RSP_TYPE 504, and RSP_FILENAME 505 fields to indicate the mailbox number of the ad responded to, the date and time of the response, the format of the video file, and the location of the video file on the IWS. Finally, the field RSP_CONVERSION_FLAG 506 is set to TRUE for both record formats (AVI and VDOLive) in the Ad Database to indicate that the video file(s) does not need to be converted 1509.

Response Matching Via the Internet

As previously indicated, if the user selects the matching option 2415 in FIG. 14, the IWS queries the Ad Database to find other ads that are similar to the ad selected by the caller. Specifically, an ad is deemed to be similar if the age in the ad's profile is within five years of the profile of the ad selected by the caller and if the ads have the same gender and marital status. Its is to be understood that the criteria used to determine a similar ad could vary greatly in kind and quantity.

Notifying an Advertiser of a Response

Figure 17:
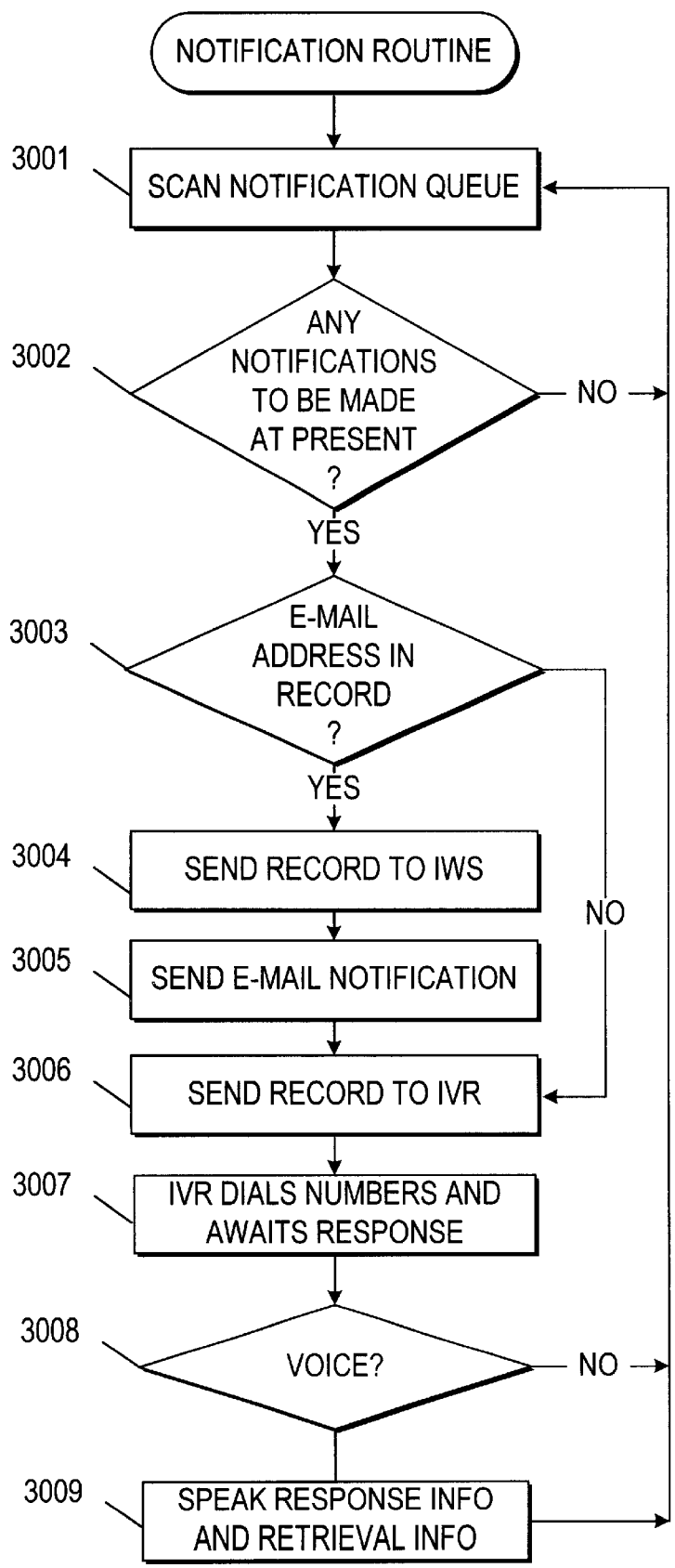
FIG. 17 shows a flow diagram of an exemplary operation of the process of notifying an advertiser of a response as accomplished by the present invention.

FIG. 17 illustrates the notification routine that processes the records placed in the notification queue in step 2322 of FIG. 13 and step 2425 of FIG. 14. In step 3001, the DBS scans the notification queue to determine if any notifications are scheduled to be made at the present time. As previously described, each notification record includes the telephone number and e-mail address, if available, of the advertiser to be notified. In step 3003, the DBS scans the notification record for an e-mail address. If an e-mail address is present, the DBS sends the record to the IWS 3004 In step 3005, the IWS sends an e-mail message to the advertiser informing him that a response has been made to his ad. The e-mail message includes a link that can be followed to the actual response for those retrieving their e-mail via a browser. Step 3006 sends the record to the IVR. In step 3007, the IVR dials an advertiser's telephone number contained in the callback record and waits for a response. If a voice response is not received, then the IVR sends a corresponding message to the DBS. The DBS then marks the time of the attempted callback in the notification queue record, so that a set period of time can be established between callback attempts. Note could also be made if an e-mail message had been sent to avoid sending duplicate notifications. If a voice response is received 3008, then in step 3009, then the IVR sends a voice message informing the advertiser that a response has been made to his ad. The voice message also gives a telephone number and Internet address that can be used to retrieve the response. It may be desirable in certain applications to prompt the person who answers the telephone for a password and mailbox number to verify their identity. Also, it may be desirable to actually allow the person to listen to the response during the call.

Retrieving Messages Through a Telephone

Figure 18:
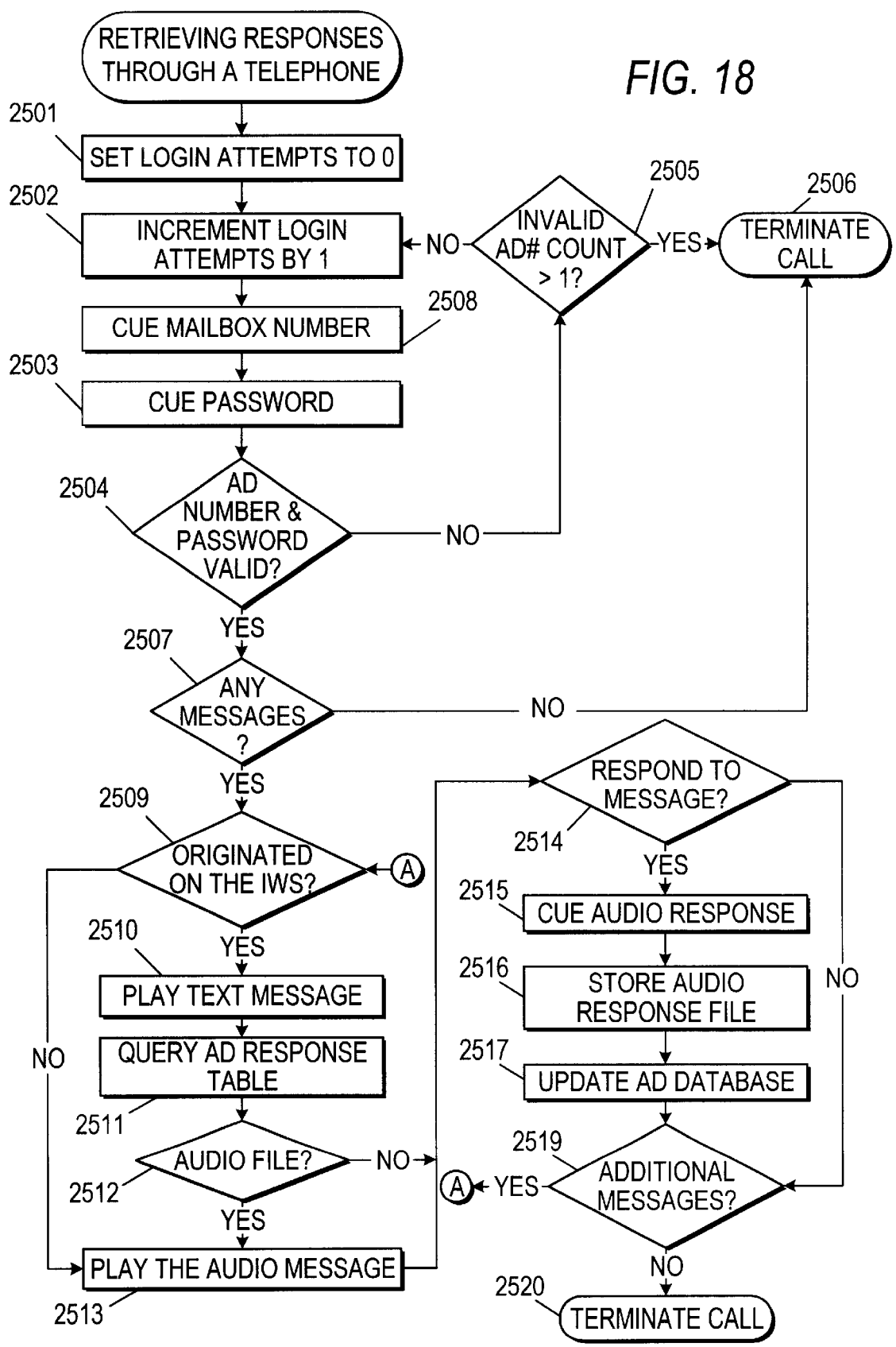
FIG. 18 shows a flow diagram of an exemplary operation of the process of retrieving responses through a telephone as accomplished by the present invention.

An exemplary operation of the system, with regard to an advertiser retrieving response messages to his personal ad will now be treated to accomplish the process as indicated in FIG. 18. First, suppose an advertiser at terminal T1 places a call to retrieve messages left in response to his ad. The assumed call involves the advertiser actuating the buttons to input the number 1 900 777 4444, for example. As a result, signals are provided to the public telephone network resulting in a connection from the remote terminal T1 to the IVR. Using standard DNIS techniques, the IVR associates the called number 1 900 777 4444 with a specific format, for example, a message retrieval format.

Referring to FIG. 18, upon receiving a call, the IVR sets the "logon attempts" equal to zero 2501. The IVR then increments the "logon attempts" by one 2502 and cues the caller for a mailbox number 2508 and password 2503. The IVR then queries the Ad Database to determine if the mailbox number and password are valid 2504. If the entries are not valid, the IVR determines if the caller has exceeded the maximum number of logon attempts allowed 2505. If the caller has exceeded the maximum number of logon attempts allowed, the call is terminated 2506. If the maximum number of logon attempts allowed has not been exceeded, the IVR increments the "logon attempts" by one 2502 and again cues the caller for a mailbox number and password.

If the entries are valid, the IVR then queries the AD_RESPONSE_TABLE of FIG. 5 to determine if the advertiser has any response messages 2507. If the advertiser has no response messages, the call is terminated 2506. If the IVR finds a response message, the IVR queries the field AD_ORIGIN 211 to determine if the response message originated on the Internet 2509. If the response message originated on the telephone, the IVR plays the audio response message 2513. If the response message originated on the Internet, the IVR uses text to speech to play the text response message as placed on the Internet 2510. The IVR then queries the AD_GREETINGS_TABLE of FIG. 3 to determine if the Internet respondent also submitted an audio response message 2511. If the query does not find an audio greeting 2512, the IVR prompts the caller to indicate if he wishes to respond to the message 2514. If the query finds an audio greetings 2512, the IVR plays the audio greetings 2513. The IVR then prompts the caller to indicate if he wishes to respond to the message 2514.

If the caller elects not to respond to the message, the IVR queries the AD_RESPONSE_TABLE of FIG. 5 to determine if the advertiser has any additional response messages 2519. If an additional response message is found, the caller is returned to block 2509 for processing. If an additional response message is not found, the call is terminated 2520. If the caller elects to respond to the message, the IVR cues the caller to record his response 2515. The IVR then stores the response to a disk file 2516 and updates the Ad Database 2517. Specifically, the IVR creates a new record in the AD_RESPONSE_TABLE of FIG. 5 populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox-number of the system user to whom the response is directed, the mailbox number of the respondent, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR also creates a new RealAudio .RA file from Dialogic .VOX file and stores the RealAudio file to a disk file on the IWS. Specifically, the IVR creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to RA to indicate that the audio recording is in the RealAudio .RA file format. Finally, the field RSP_CONVERSION_FLAG 506 is set to TRUE for both the audiotext .VOX file and the RealAudio .RA file to indicate that the audio files do not need to be converted.

Next, the IVR queries the AD_RESPONSE_TABLE of FIG. 5 to determine if the advertiser has any additional response messages 2519. If an additional response message is found, the caller is returned to block 2509 for processing. If no additional response messages are found, the call is terminated 2520.

Retrieving Messages Through the Internet

Figure 19:
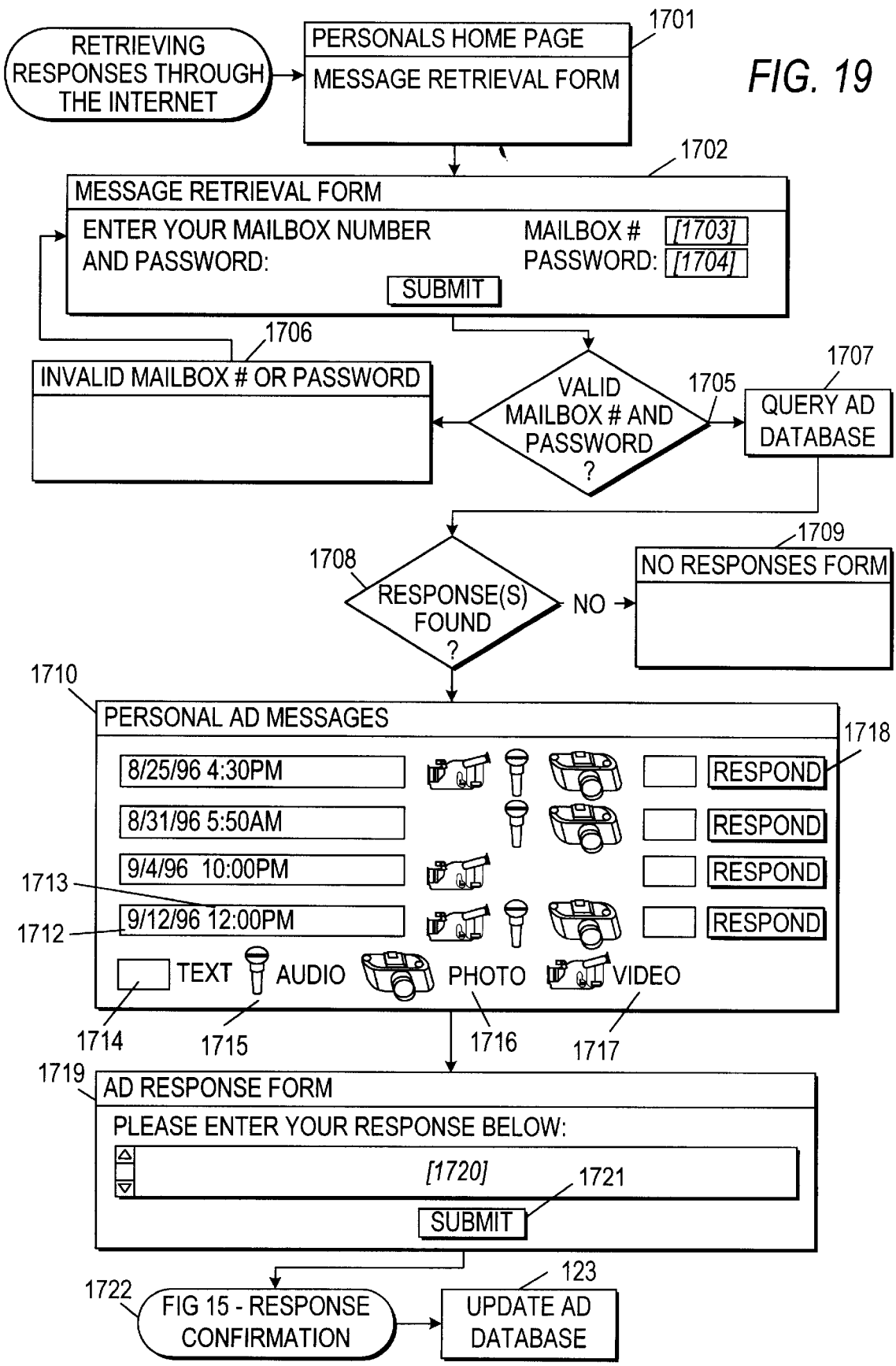
FIG. 19 shows a flow diagram of an exemplary operation of the process of retrieving responses through the Internet as accomplished by the present invention.

An exemplary operation of the system of the present invention, with regard to an advertiser retrieving her messages via the Internet will now be treated to accomplish the process as indicated in FIG. 19. First, suppose an advertiser at terminal CT1 connects to the Internet to retrieve messages. The assumed Internet user connects to the Internet and inputs a Uniform Reference Locator URL, for example: http://www.personal_ads.com, resulting in a connection from the remote terminal CT1 to a Home Page 1701 on the Internet Web Server.

Referring to FIG. 19, from the Home Page 1701 on the Internet Web Server, the advertiser selects a Message Retrieval Form 1702. The Message Retrieval Form 1702 instructs the advertiser to enter a mailbox number 1703 and password 1704. The IWS then queries the Ad Database to determine if the mailbox number and password are valid 1705. If the entries are not valid, the Internet user is presented with an Invalid Mailbox and Password Form 1706. If the entries are valid 1705, the IWS queries the Ad Database 1707 to find responses to the advertiser's ad.

If there are no responses, the IWS presents the advertiser with a No Responses Form 1709. If the IWS finds one or more responses, the IWS presents the advertiser with a Personal Ad Messages Form 1710. The Personal AD Messages Form 1709 shows any messages for the advertiser. Each message shows the date 1712 and time 1713 the message was received and contains one or more icons that represent the contents of the message. A text icon 1714 denotes a text message; an audio icon 1715 denotes an audio message; a still camera icon 1716 denotes a photograph; a video camera icon 1717 denotes a video clip. By clicking on an icon, the advertiser can view or listen to the associated file. The Internet user responds to a message ad by selecting its associated "Respond" button 1718.

When the Internet user selects the respond button, she is transferred to an Ad Response Form 1719. The Internet user creates a response by completing a response text field 1720. After completing the Ad Response Form, the Internet user submits the form by pressing the "Submit" button 1721. The advertiser is then presented with a Response Confirmation Form 1722 which is illustrated in FIG. 16. The Response Confirmation Form gives the advertiser information on enhancing her response with an audio message, photograph, or video clip.

The IWS then stores the response to a disk file and updates the Ad Database 1723. Specifically, the IWS creates a new record in the AD_RESPONSE_TABLE of FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the system user to whom the response is directed, the mailbox number of the respondent, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format

What is claimed is:

1. A computer based advertising system, wherein said system comprises:

a remote terminal;

means for interfacing said remote terminal to the Internet, said means for interfacing providing means for placing advertisements, means for placing audio recordings, and means for providing input data;

storage means coupled to said means for interfacing, said storage means being capable of storing said advertisements, said audio recordings, and said input data;

publication means coupled to said storage means for publishing said advertisements, said publication means including means for playing said audio recordings via the Internet;

control means coupled to said publication means, said control means capable of processing said advertisements for said publishing and capable of processing said input data to isolate a subset of said advertisements; and response means for responding to said advertisements by sending an anonymous audio message;

wherein said audio recordings are associated with said advertisements.

2. A system according to claims 1, wherein said response means includes a means to create a voice mail box.

3. A system according to claim 1, wherein said audio message can be played via a telephone and via the Internet.

4. A system according to claim 1, wherein said remote terminal apparatus comprises a telephone.

5. A system according to claim 1, wherein said remote terminal apparatus comprises a computer.

6. A system according to claim 1, wherein said response means comprises a telephone.

7. A system according to claim 1, wherein said response means comprises a computer.

8. A system according to claim 1, wherein a fee is charged to send said anonymous audio message.

9. A system according to claim 1, wherein said system further comprises:

means for placing video recordings; and means for playing said video recordings via the Internet;

wherein said video recordings are associated with said advertisements.

10. A system according to claim 1, wherein said system further comprises:

means for responding to said advertisements by sending a video message; and means for playing said video message via the Internet.

11. A system according to claim 1, wherein said system further comprises:

means for placing digital photographs; and means for displaying said digital photographs via the Internet;

wherein said digital photographs are associated with said advertisements.

12. A computer based advertising system, wherein said system comprises:

a remote terminal;

means for interfacing said remote terminal to the Internet, said means for interfacing providing means for placing advertisements, means for placing audio recordings, and means for providing input data;

storage means coupled to said means for interfacing, said storage means being capable of storing said advertisements, said audio recordings, and said input data;

publication means coupled to said storage means for publishing said advertisements, said publication means including means for playing said audio recordings via the Internet;

control means coupled to said publication means, said control means capable of processing said advertisements for said publishing and capable of processing said input data to isolate a subset of said advertisements; and response means for responding to said advertisements by sending an anonymous video message;

wherein said audio recordings are associated with said advertisements.

13. A system according to claim 12, wherein said response means includes a means to create a voice mail box.

14. A system according to claim 12, wherein said audio message is capable of being played via a telephone or via the Internet.

15. A system according to claim 12, wherein said remote terminal comprises a telephone.

16. A system according to claim 12, wherein said remote terminal comprises a computer.

17. A system according to claim 12, wherein said response means comprises a telephone.

18. A system according to claim 12, wherein said response means comprises a computer.

19. A system according to claim 12, wherein a fee is charged for sending said anonymous audio message.

20. A system according to claim 12, wherein said system further comprises:

means for placing video recordings; and means for playing said video recordings via the Internet; wherein said video recordings are associated with said advertisements.

* * * * *